US009195351B1

(12) United States Patent
Rosenberg et al.

(10) Patent No.: US 9,195,351 B1
(45) Date of Patent: Nov. 24, 2015

(54) CAPACITIVE STYLUS

(75) Inventors: Ilya D. Rosenberg, Mountain View, CA (US); Julien G. Beguin, San Francisco, CA (US); Tomer Moscovich, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 447 days.

(21) Appl. No.: 13/434,093

(22) Filed: Mar. 29, 2012

(51) Int. Cl.
*G06F 3/044* (2006.01)
*G06F 3/046* (2006.01)

(52) U.S. Cl.
CPC ................ *G06F 3/044* (2013.01); *G06F 3/046* (2013.01)

(58) Field of Classification Search
CPC .......... G06F 3/043; G06F 3/044; G06F 3/046
USPC .......... 178/18.02, 19.01, 19.02; 345/179, 173
See application file for complete search history.

(56) References Cited

U.S. PATENT DOCUMENTS

| 5,914,708 | A | * | 6/1999 | LaGrange et al. ............. 345/179 |
| 5,977,959 | A | | 11/1999 | Katsurahira et al. |
| 6,129,668 | A | | 10/2000 | Haynor et al. |
| 2002/0063688 | A1 | * | 5/2002 | Shaw et al. .................... 345/163 |
| 2002/0134594 | A1 | * | 9/2002 | Taylor et al. ............... 178/18.01 |
| 2003/0095115 | A1 | | 5/2003 | Brian et al. |
| 2004/0100457 | A1 | | 5/2004 | Mandle |
| 2004/0233177 | A1 | | 11/2004 | Blacklock |
| 2006/0158440 | A1 | | 7/2006 | Ashenbrenner |
| 2007/0018076 | A1 | | 1/2007 | Chen et al. |
| 2007/0085836 | A1 | | 4/2007 | Ely |
| 2007/0242075 | A1 | | 10/2007 | Dent |
| 2007/0300182 | A1 | | 12/2007 | Bilow |
| 2008/0074400 | A1 | | 3/2008 | Gettemy et al. |
| 2008/0120568 | A1 | | 5/2008 | Jian et al. |
| 2008/0174852 | A1 | | 7/2008 | Hirai et al. |
| 2009/0100578 | A1 | * | 4/2009 | Coates .............................. 2/455 |
| 2009/0167702 | A1 | | 7/2009 | Nurmi |

(Continued)

FOREIGN PATENT DOCUMENTS

| JP | H08-152955 A | 6/1996 |
| JP | 2002-373051 A | 12/2002 |

(Continued)

OTHER PUBLICATIONS

The PCT Search Report mailed Nov. 29, 2012 for PCT application No. PCT/US12/57458, 7 pages.

(Continued)

*Primary Examiner* — Sahlu Okebato
(74) *Attorney, Agent, or Firm* — Lee & Hayes, PLLC

(57) ABSTRACT

In some implementations, a stylus having a variable capacitive coupling mechanism may include a conductive stylus tip and a conductive stylus body. A spacer of resilient material may be positioned between the stylus body and the stylus tip. The spacer may be compressed when a user presses the stylus tip against a contact surface an electronic device having of a capacitive touch sensor. The compression of the spacer moves the stylus body closer to a proximal portion of the tip, which increases the capacitive coupling of the stylus with the touch sensor and provides an indication of the amount of pressure applied to the stylus tip by the user. In some examples, the stylus may further include a magnet, and the electronic device may include at least one magnetic field sensor to detect the orientation and/or angle of the magnet and, thus, the orientation and/or angle of the stylus.

22 Claims, 13 Drawing Sheets

(56) References Cited

U.S. PATENT DOCUMENTS

| | | | |
|---|---|---|---|
| 2009/0251420 A1* | 10/2009 | Do et al. | 345/173 |
| 2009/0262637 A1* | 10/2009 | Badaye et al. | 369/126 |
| 2009/0310875 A1 | 12/2009 | Po et al. | |
| 2010/0097324 A1 | 4/2010 | Anson et al. | |
| 2010/0277327 A1 | 11/2010 | Lee | |
| 2011/0115741 A1* | 5/2011 | Lukas et al. | 345/174 |
| 2011/0285670 A1* | 11/2011 | Li et al. | 345/179 |
| 2011/0304577 A1* | 12/2011 | Brown et al. | 345/174 |
| 2012/0013571 A1* | 1/2012 | Yeh et al. | 345/174 |
| 2012/0158629 A1* | 6/2012 | Hinckley et al. | 706/15 |
| 2012/0228039 A1* | 9/2012 | Hinson et al. | 178/19.03 |
| 2012/0249474 A1* | 10/2012 | Pratt et al. | 345/174 |
| 2013/0068038 A1* | 3/2013 | Bolender et al. | 73/862.626 |

FOREIGN PATENT DOCUMENTS

| | | | |
|---|---|---|---|
| JP | 2003-083709 A | 3/2003 | |
| JP | 2004-523817 A | 8/2004 | |

OTHER PUBLICATIONS

Ashbrook, et al., "Nenya: Subtle and Eyes-Free Mobile Input with a Magnetically-Tracked Finger Ring", CHI 2011, May 7-12, 2011, 4 pages.

Harrison, et al., "Abracadabra: Wireless, High-Precision, and Unpowered Finger Input for Very Small Mobile Devices", In Proceedings of the 22nd Annual ACM Symposium on User interface Software and Technology (Victoria, British Columbia, Canada, Oct. 4-7, 2009), UIST '09, ACM, New York, NY, 4 pages.

Office Action for U.S. Appl. No. 13/247,412, mailed on Jan. 12, 2015, Ilya D. Rosenberg, "Magnetic Stylus", 28 pages.

The Extended European Search Report mailed May 21, 2015 for European Patent Application No. 12836358.7, 7 pages.

Translated Japanese Office Action mailed Apr. 7, 2015 for Japanese patent application No. 2014-532119, a counterpart foreign application of U.S. Appl. No. 13/247,412, 7 pages.

* cited by examiner

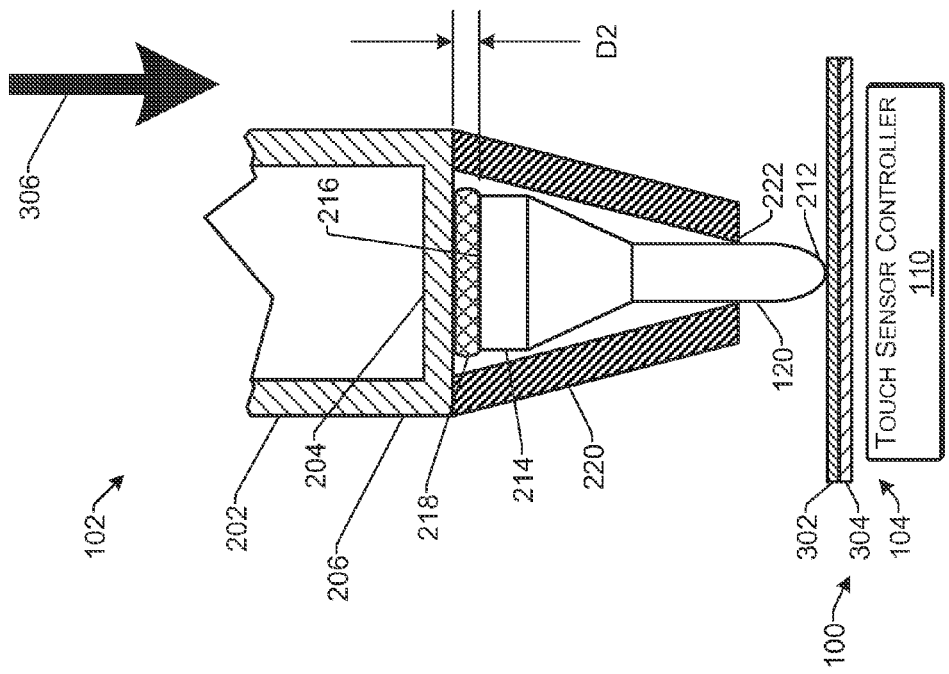
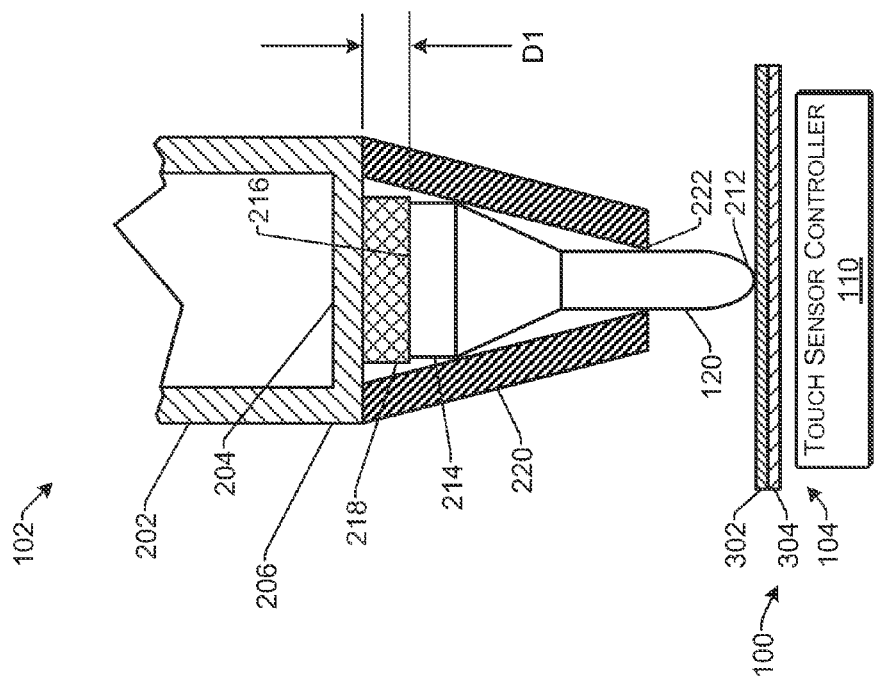

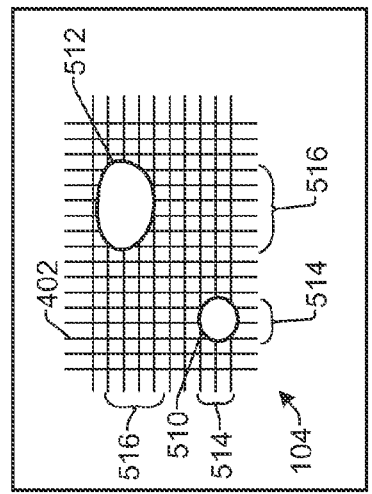
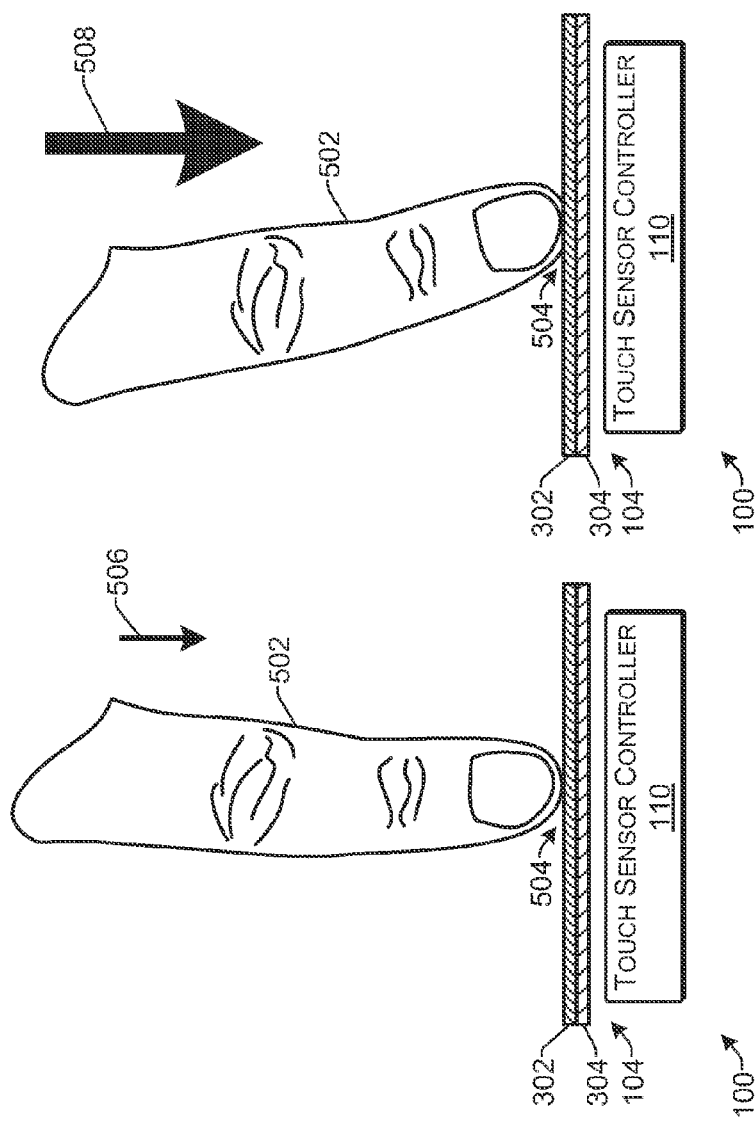
FIG. 5C
FIG. 5B
FIG. 5A

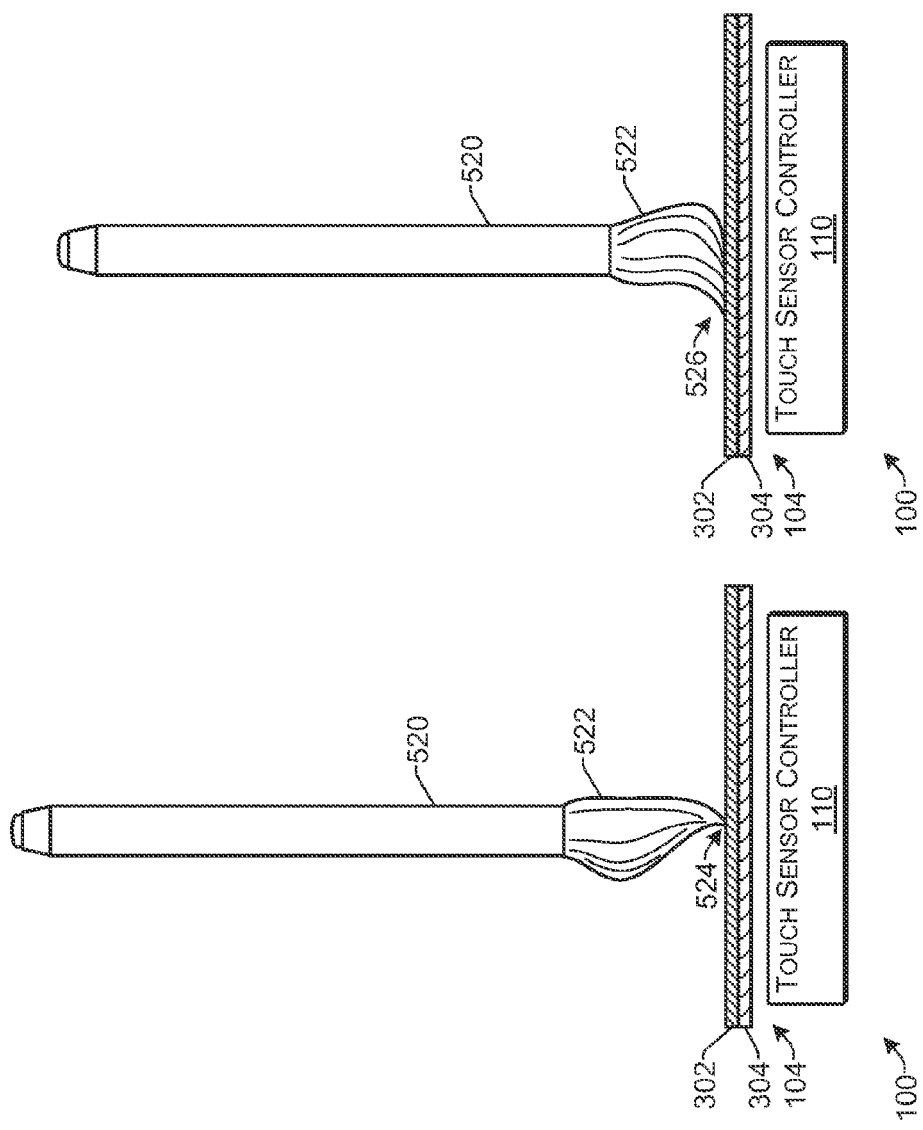
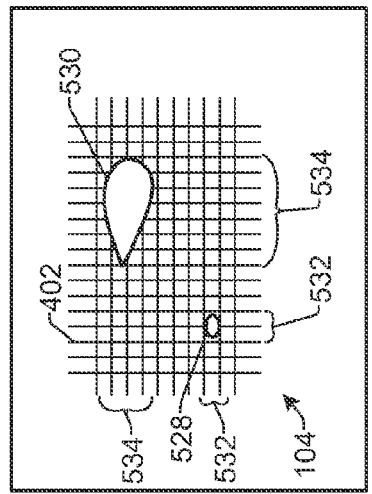
FIG. 5D  FIG. 5E  FIG. 5F

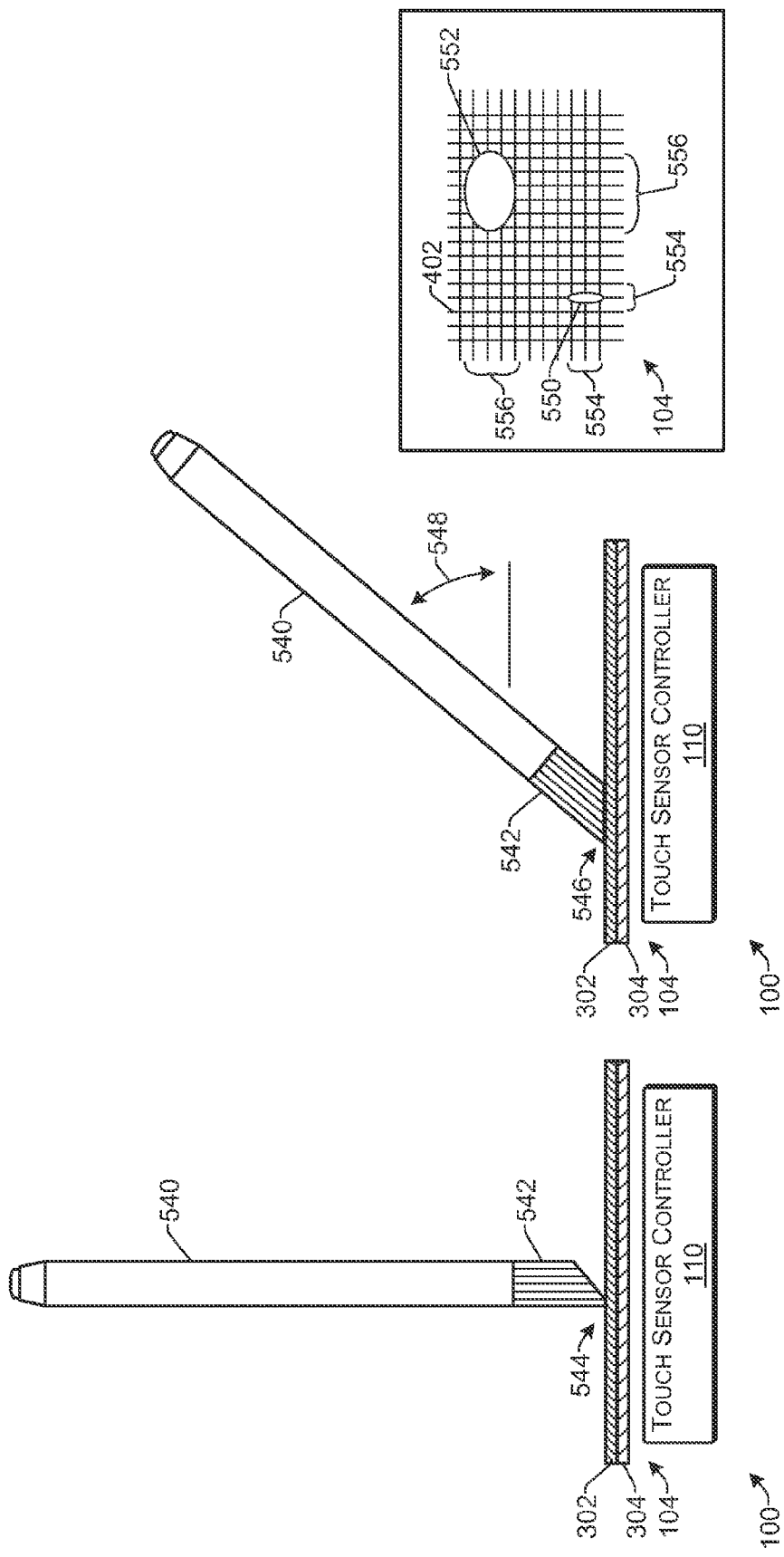

CAPACITIVE STYLUS

CROSS REFERENCE TO RELATED APPLICATION

This application is related to U.S. patent application Ser. No. 13/247,412, filed Sep. 28, 2011, which is incorporated by reference herein in its entirety.

BACKGROUND

The recent proliferation of smart phones, tablet computing devices, electronic book (eBook) reading devices, mobile computing devices, digital media devices, and the like, has led to a huge increase in the use of touchscreen technology. For example, touchscreens enable convenient user interface interaction with a device by touching a display with a finger, and without the use of devices such as a mouse or keyboard. However, a finger does not always provide a desired level of precision for some types of inputs to conventional touch sensors.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 3A-3B illustrate an enlarged cross-sectional view of a portion of the stylus depicting an example of varying the capacitive coupling based on an amount of force applied to the tip of the stylus according to some implementations.

FIGS. 5A-5I illustrate several examples in which the high-resolution touch sensor may be used to detect a force and/or an orientation a user's finger or a stylus with respect to a touch surface according to some implementations.

DETAILED DESCRIPTION

Stylus Input to an Electronic Device

Figure 1:
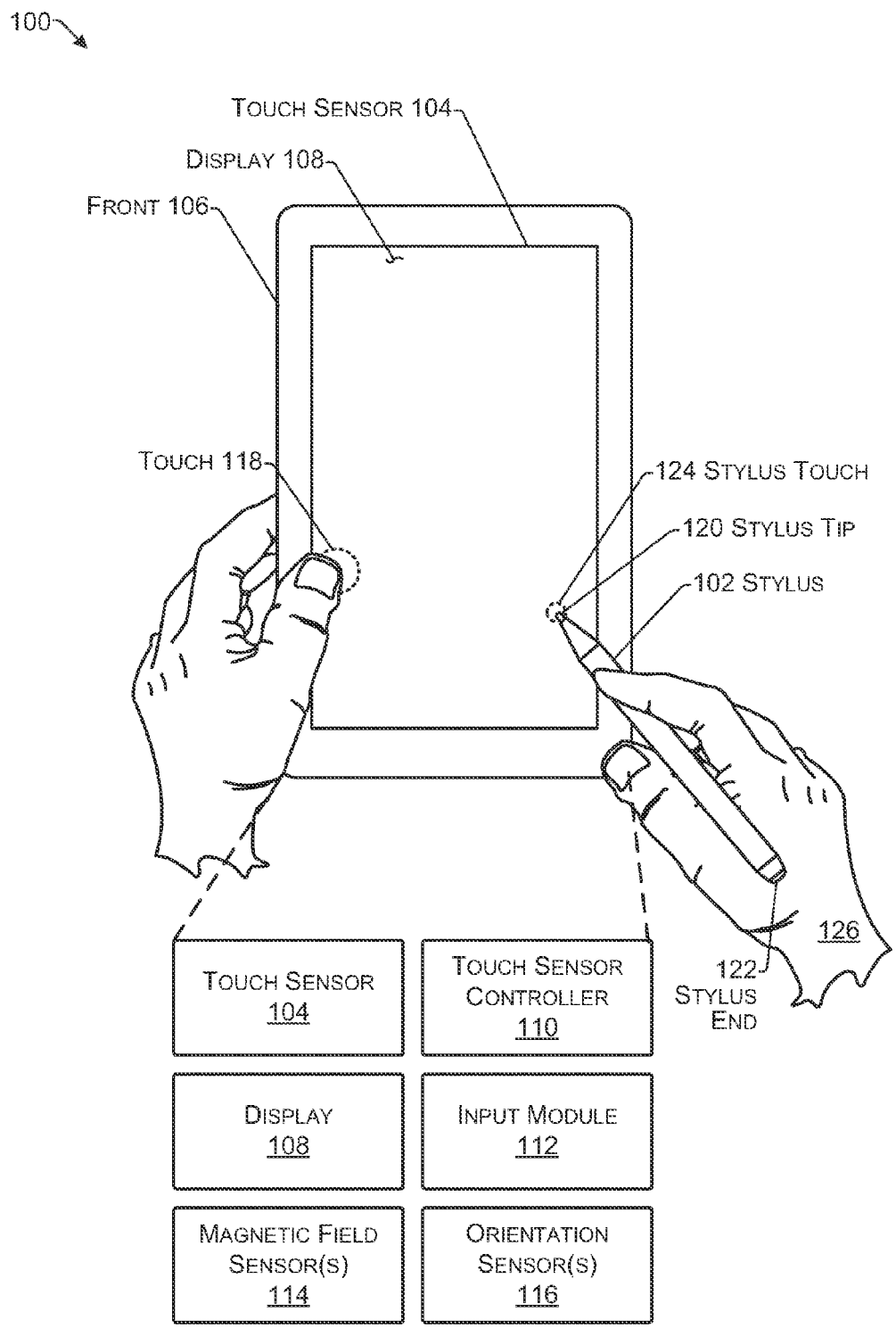
FIG. 1 illustrates an example electronic device configured with a touch sensor and one or more magnetic field sensors to be used with a stylus according to some implementations.

This disclosure includes devices, techniques and arrangements for providing inputs to an electronic device. For example, a stylus may provide touch inputs to a touch sensor of an electronic device. In some implementations, the stylus may be a passive stylus able to be used with a capacitive touch sensor of the electronic device. The stylus may be configured to vary its capacitive coupling with respect to a variation in force applied to the tip of the stylus. For instance, the stylus may be pressure sensitive through implementation of a mechanism to vary the capacitive coupling of the stylus tip to the stylus body, and thus to the user's hand. Due to this mechanism, when the user applies the stylus tip to the capacitive touch sensor, the amount of force applied to the stylus tip by the user may correspond to the strength of the capacitive signal detected by the capacitive touch sensor.

The variable capacitive coupling mechanism of the stylus may be configured such that even when very little pressure is applied, a detectable capacitive signal can be detected by the touch sensor when the stylus tip is in contact with the touch sensor (or the display screen) of the electronic device. This allows the user to perform inputs such as writing or drawing with very light pressure. Further, when additionally downward force or pressure is applied, the capacitive signal may increase in a manner that is detectable by the touch sensor, which may be used to produce input effects such as writing or drawing with a thicker or darker line, etc.

As one example, a stylus with a variable capacitive coupling mechanism may include a conductive stylus tip and a conductive stylus body. A thin layer or spacer of resilient dielectric polymer, such as a microcellular urethane foam, or other suitable non-conductive resilient member, may be employed between the conductive stylus body and the conductive stylus tip. When a force is applied to the stylus in the direction of the tip, the stylus body compresses the resilient spacer, moving the stylus body closer to a proximal portion of the tip, thereby increasing the capacitive coupling between the stylus body and the tip. A similar variable capacitive coupling mechanism may be applied on an opposite end of the stylus to provide an eraser that enables pressure-sensitive erasing or other desired input functions.

According to some implementations, a capacitive touchscreen sensor may include a high-resolution touch sensor having an electrode grid with a substantially closer pitch than in conventional touch sensors. For example, conventional capacitive touch screens are designed for tracking fingers and therefore the pitch between the electrodes in the rows and columns of electrodes is typically between 4-5 mm. Such spacing between electrode elements is sufficient for tracking an object having the size of a typical human finger (e.g., the human finger tends to be about 5 to 15 mm in diameter). On the other hand, in order to track a stylus tip, which may have a diameter on the order of 1 to 2 mm, some implementations herein include a touch sensor having electrodes with a pitch of 0.5-3.0 mm. As one non-limiting example, a 2 mm electrode pitch may be employed with a capacitive sensor to track a stylus with a tip diameter of about 1.5 mm (which is slightly larger than the tip diameter of a standard ballpoint pen).

Furthermore, the high-resolution capacitive touch sensor according to some implementations may accurately distinguish between a stylus tip and a finger based on their respective areas. Additionally, the high-resolution capacitive screen according to some implementations herein can enable the device to more accurately compute relative touch areas and shapes. For example, the high-resolution sensor may allow for some level of force-sensitivity for finger touches on the capacitive touch sensor and/or for determining force or orientation of styli with deformable tips. Further, the high-resolution capacitive touch sensor according to some implementations herein can perform high quality palm rejection better than conventional capacitive touch screens. For example, the high-resolution capacitive touch sensor herein and associated algorithms may be calibrated with suitable thresholds to be more sensitive to different types of touches than a conventional touch sensor for enabling rejection of palm touches and other extraneous inputs.

Some implementations herein include a stylus containing a magnet that is detectable by one or more magnetic field sensors (e.g., magnetometers) associated with the electronic device. By obtaining information from the magnetic field sensors about the position or orientation of the stylus, implementations herein enable rich input modes alone or in combination with one another. For example, a magnet inside or attached to the stylus and a magnetic tracking capability in the electronic device may be used to enable detection of stylus orientation and tilt. Further, because the high-resolution capacitive touch sensor described herein is able to distinguish between a finger and a stylus quite reliably, the magnetic stylus tracking functionality can be used for determining the orientation and/or tilt of the stylus, such as when the stylus is touching the display. This reduces the degrees of freedom in the stylus position and simplifies tracking of the orientation of the magnetic stylus. The magnet in the stylus can also assist, at least in part, with stylus docking such as for adhering the stylus to the electronic device.

In some examples, palm rejection may be performed by relying on input from at least one of the capacitive touch sensor or the magnetic stylus tracking system. For example, during stylus use, such as while writing or drawing on a display including the touch sensor, a part of the user's hand may rest on the touch sensor. Accordingly, implementations herein may determine magnetically the orientation and, in some cases, the position of the stylus. Further, the high-resolution capacitive touch sensor may determine capacitively a size and location of a touch. Thus, these inputs may be used individually, or may be combined, for identifying and distinguishing palm touches or other unintentional touches from intended touches. Thus, the palm touches and other unintentional touched may be designated as non-input touches and disregarded by a user interface.

Furthermore, in some examples, touches may be distinguished based on the presence or absence of the magnetic field. For example, when no magnetic field meeting pre-defined criteria is present, a touch may be determined to be a finger touch, in contrast to when the magnetic field having the pre-defined criteria is present which determines the touch to be the magnetic stylus. In another example, which end of a stylus is touching the touch sensor is distinguishable independent of the touch profile of the stylus based on the polarity of the magnetic field detected. Accordingly, one end of the stylus may be used for writing, drawing, etc., while the other end of the stylus may be use for another function, such as erasing, painting, highlighting etc.

The pre-defined criteria of the magnetic field may include field strength, direction, and so forth. These characteristics of the magnetic field allow for additional user input and modes. For example, the width of a line being drawn on a display may be varied depending upon the tilt of the stylus with respect to some point, line, or plane of reference. In another example, an offset correction resulting from the tilt may be applied. Additionally, by using the position information of the magnet in the stylus, non-contact or near-touch sensing is possible. For example, movement of the stylus proximate to the magnetic field sensor but not into contact with the touch sensor may still provide input. Thus, when the stylus is detected as being proximate to touch sensor, inputs that look like a palm or the like may be readily rejected on the assumption that the user is preparing to use the stylus.

In some implementations, the stylus incorporates at least one magnet, but in other implementations, a magnet is not included. Further, in some cases, the stylus may be passive and unpowered, while in other cases, the stylus may include an active component such as a transmitter. For example, an active stylus may generate a signal that can be detected by the capacitive electrodes of the touch sensor, or that can otherwise be received by the electronic device. Further, the active stylus may include force sensitivity by include a variable capacitor that can modulate the transmitted signal in response to variations in an amount of force applied to the stylus tip. Additionally, the active stylus may include one or more orientation sensors, thereby reducing or eliminating the need for a magnet in the stylus and magnetic field sensors in the electronic device.

Some example implementations are described in the environment of a touchscreen of a mobile device, such as a smart phone, a tablet computing device, a mobile computing device, a digital media device, and so forth. However, the implementations herein are not limited to the particular examples provided, and may be extended to other types of devices and other types of technologies, as will be apparent to those of skill in the art in light of the disclosure herein.

Example Device

FIG. 1 illustrates an electronic device 100 configured to be useable with a stylus 102 according to some implementations. The electronic device 100 may be implemented as any of a number of electronic devices, such as an eBook reader, a tablet computing device, a smart phone, a portable gaming device, a portable digital assistant, a laptop or netbook computer, and so forth. Furthermore, the electronic device 100 may not necessarily be a mobile or portable device, and thus, in some implementations may include a display of a desktop, a workstation, or a server computing device, a cash register, a gaming system, a television, an appliance, industrial equipment, home electronics, and so forth.

The stylus 102 may be used with the electronic device 100 for enabling a user to make inputs using the stylus 102, such as by touching the stylus to a touch sensor 104. The touch sensor 104 may be a capacitive touch sensor that accepts inputs resulting from application of an input object, such as a user's finger or the stylus 102, on or very near to the touch sensor 104. While in some examples the touch sensor 104 may be on the front of the device 100, it is understood that in other examples, the touch sensor 104 or other touch sensors may be disposed along the other sides of the device instead of, or in addition to, the touch sensor 104 on the front side 106 of the electronic device 100. Furthermore, in some examples, the touch sensor 104 may be a high-resolution touch sensor having an electrode pitch that is substantially smaller than that of conventional capacitive touch sensors.

A display 108 may be configured to present information to the user. The display 108 may be any suitable type of display. In some implementations, the display 108 and the touch sensor 104 may be combined to provide a touch-sensitive display or touchscreen display. The touch sensor 104 may be located above the display (i.e., over top of the display surface), under the display 108 (i.e., behind the display surface) or within the display.

A touch sensor controller 110 may receive or collect the touch input information received by the touch sensor 104, and provide the touch input information to an input module 112. For example, the input module 112 may be executed by a processor (not shown in FIG. 1) on the device 100, and may accept inputs received by the touch sensor 104 and/or one or more other sensors, such as one or more magnetic field sensors 114 or one or more orientation sensors 116.

Further depicted in FIG. 1 with a broken line is a user touch 118 on the touch sensor 104. In some examples, the user touch 118 may be ignored or rejected based on the detected presence of the stylus and/or based on other considerations. Also depicted in FIG. 1 is the stylus 102 having two opposing terminal structures, namely, a stylus tip 120 and a stylus end 122. The stylus tip 120 is shown in contact with the touch sensor 104 as indicated by a stylus touch 124. In some implementations, the stylus tip 120 may be configured to be non-marking such that it operates freely without depositing a visible trace of material, and without scratching the display 108 or other contact surface. In some examples, the stylus 102 may be at least partially electrically conductive to establish a capacitive coupling between the capacitive touch sensor 104 and the user's hand 126 in a manner similar to a user's finger.

Furthermore, as mentioned above, in some examples, the device 100 may include one or more magnetic field sensors 114 that are accessible to the input module 112. These magnetic field sensors 114 are configured to detect and, in some implementations, characterize impinging magnetic fields along one or more mutually orthogonal axes, such as a magnetic field emitted by a magnet (not shown in FIG. 1) in the stylus 102. This characterization may include a linear field strength and polarity along each of the axes. The magnetic field sensors 114 described herein may be, in some examples, magnetic field sensors that allow for determining a magnetic field strength, angular bearing, polarity of the magnetic field, and so forth. In some implementations, the magnetic field sensor 114 may comprise a Hall-effect device, vector magnetometer, coil magnetometer, fluxgate magnetometer, spin-exchange relaxation-free atomic magnetometers, anisotropic magnetoresistance (AMR), tunneling magnetic resistance (TMR), giant magnetoresistance (GMR), magnetic inductance, and so forth. Magnetometers which are not magnetized by strong magnetic fields may be preferred in some implementations. Magnetometers which may become magnetized may be accompanied by a degaussing mechanism. The magnetic field sensors 114 may comprise a plurality of sensing elements to provide a three-dimensional magnetic field vector. Magnetic fields, particularly in the environment within which electronic devices operate, are predictable and well understood. As a result, it becomes possible to use one or more magnetic field sensors 114 to detect the presence and in some implementations the position, orientation, rotation, and so forth, of a magnet included in the stylus 102.

In addition, one or more orientation sensors 116 such as accelerometers, gravimeters, gyroscopes, or the like, may also be present in the electronic device 100, and may be used for determining an orientation of the device 100, as well as for providing a reference for determining an orientation of the stylus 102. Additionally, while several components of the electronic device 100 and the stylus 102 have been described above, numerous other components not specifically described may be included in these devices as will be apparent to those of skill in the art in light of the disclosure herein.

Example Stylus

Figure 2:
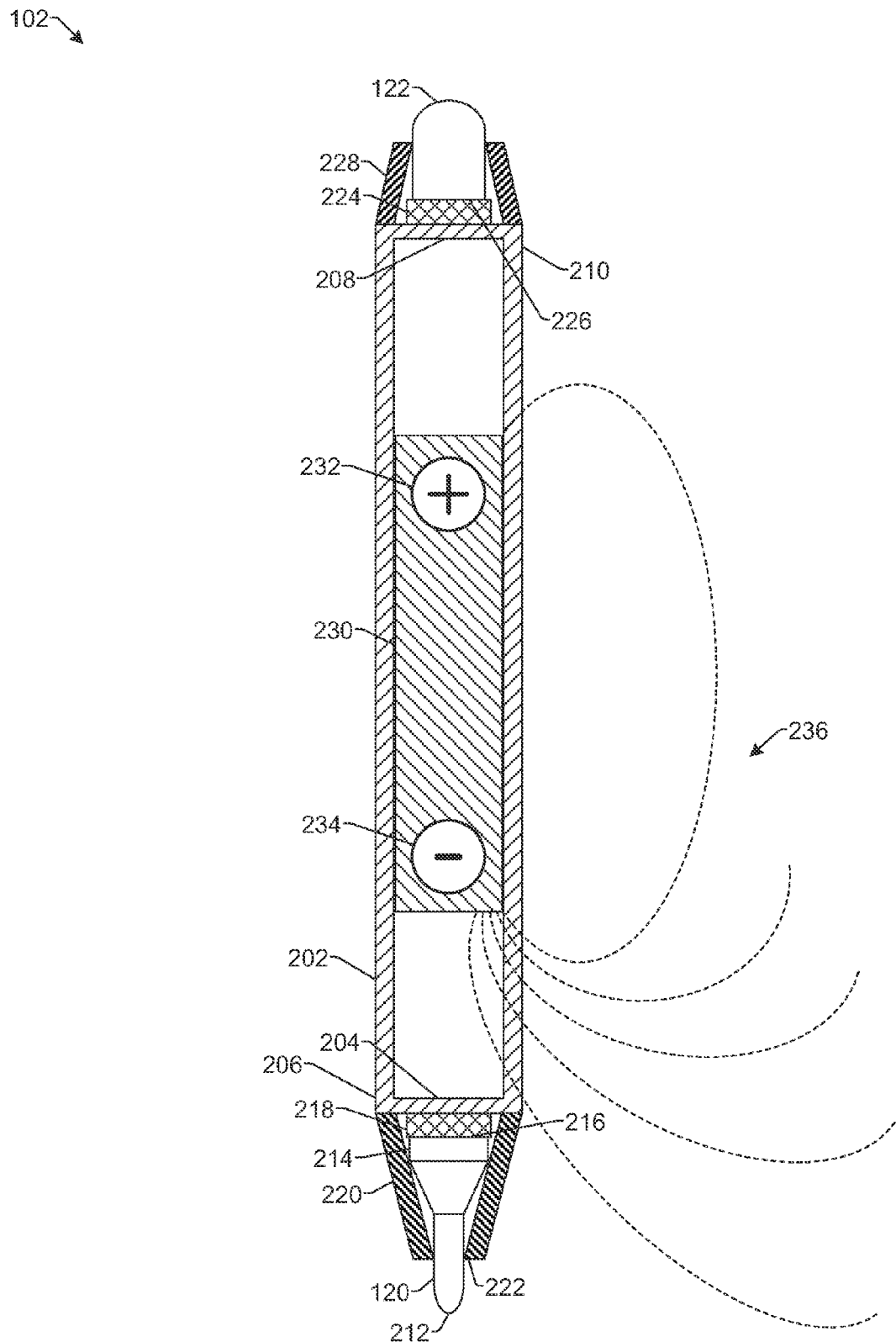
FIG. 2 illustrates a cross-sectional view of an example stylus according to some implementations.

FIG. 2 illustrates an example configuration of the stylus 102 according to some implementations. In this configuration, the stylus 102 may be considered a passive stylus at least because the stylus 102 may not employ an onboard power source for operation. For example, the stylus 102 is electrically conductive and therefore able to function with a capacitive touch sensor in a manner similar to a user's finger, by being able to be sensed based on an amount of capacitive coupling with the touch sensor 104 of the electronic device 100. In other words, because an electrical connection may be formed between the user's hand and the stylus 102, the stylus 102 may function as an extension of the user's hand in a manner similar to a finger.

The stylus 102 includes a body 202, which may be at least partially electrically conductive. For example, in some implementations, the body 202 may be formed, at least in part, of a conductive metal, a conductive polymer, or other conductive material to be contacted by a user's hand when holding the stylus 102 for forming an electrical contact between the user's hand and the stylus body 202. The body 202 may be tubular and generally cylindrical or any other suitable shape in cross section. The body 202 may have a first conductive body portion or plate 204 located at a first end 206, near the tip 120, and may have a second conductive body portion or plate 208 located at a second end 210 of the stylus body near to the stylus end 122.

The stylus tip 120 may be formed of a suitable conductive material such as a conductive polymer, conductive metal, or other conductive material. In some examples, at least a distal contact portion 212 of the stylus tip 120 is formed of a conductive polymer or other material that is softer than a material that forms the outer surface of the display 108 of the electronic device 100 to avoid scratching the contact surface of the display 108 when using the stylus 102. In other examples, the distal contact portion 212 of the tip 120 may include a rollerball (not shown in FIG. 2) or other mechanism to avoid scratching the contact surface of the display 108 of the electronic device 100. For instance, the rollerball may be configured to provide a pre-determined level of rolling resistance. This pre-determined level of rolling resistance may be selected to provide a tactile response similar to that of a pen on paper, for example. Further, the tip 120 may be configured to dispense a fluid, which may act as a lubricant for the rollerball within the tip 120. This fluid may comprise a non-toxic material such as a silicone, hand lotion, and so forth. Where the stylus 102 is used in conjunction with the display 108, the fluid may be may be optically clear to provide reduced visual distortion to the displayed image. Accordingly, implementations herein are not limited to any particular distal tip configuration or material.

The tip 120 may include an electrically conductive tip base 214, which may be cylindrical or any other suitable shape, and which may have a substantially larger cross-section than the distal tip portion 212. The tip base 214 may have a plate-like conductive area 216 positioned proximate to the plate 204 at the first end 206 of the body 202. A separation layer or spacer 218 may be interposed between the plate 204 and the tip base 214, and may be constructed of a resilient dielectric material or other resilient insulating material able to be compressed by a force moving the body 202 in the direction of the tip 120. Examples of suitable materials include microcellular urethane closed cell foam, such as is available under the brand name Poron® from Rogers Corporation of Rogers, Conn., USA. Other examples of suitable materials may include any resilient dielectric material or insulating material able to be compressed from a first thickness to a second thickness under external force and return to the first thickness upon removal of the force. Accordingly, any number of polymeric foam or sponge materials, open celled, or closed celled materials, or other resilient materials may be employed for the spacer 218 herein. As discussed additionally below with respect to FIG. 3, when a user presses the tip 120 of the stylus 102 onto a contact surface of the electronic device 100, the user may vary the amount of force or pressure applied to the tip 120. Different amounts of force applied to the tip 120 may cause changes in the thickness of the spacer 218 and may thereby cause a variation in the capacitive coupling between the user's hand and the touch sensor 104, which can be used to control a user input based on the amount of pressure applied by the user. Furthermore, in some cases, the dielectric constant of the spacer 218 may change under compression, causing a further variation in the capacitive coupling during compression of the spacer 218. In some examples, the spacer 218 may be 0.5-2 mm in thickness, although implementations herein are not limited to any particular thickness of the spacer 218.

The tip 120 may be retained within a tip housing 220, which may be shape as a truncated cone. The tip housing includes an aperture 222 through which the distal tip portion 212 extends and which provides support to the distal tip portion 212 during application of force to the distal tip portion 212. The tip housing 220 may be made of a nonconductive plastic or other nonconductive polymer or other suitable insulating material so that there is no direct electrical connection formed between the tip housing 220 and the stylus body 202, and thus, no capacitive coupling with the tip housing 220.

At the stylus end 122, the stylus 102 may include a similar configuration that includes a spacer 224, which may be made of the same material as the spacer 218 discussed above. The stylus end 122 may be constructed at least in part of one or more conductive materials similar to the tip 120 discussed above. For example, stylus end 122 may be constructed of a conductive polymer or other suitable conductive material that will not scratch the surface of the electronic device 100. The stylus end 122 may include a base portion 226 positioned proximate to the conductive plate 208 of the body 202. Furthermore, the stylus end 122 may be maintained within an end housing 228 which may be constructed of a nonconductive material similar to the tip housing 220 discussed above. Accordingly, the stylus end 122 may be brought into contact with the contact surface of the display 108 of the electronic device 100 and used in a manner similar to that described above for the tip 120. By varying the amount of force applied to the stylus end 122, the spacer 224 compresses to provide a detectable variation in the capacitive coupling between the touch sensor 104 and the user's hand.

In the illustrated example, the stylus 102 further includes a magnet 230 having a first pole 232 and a second pole 234. The magnet 230 is shown in a solid cylindrical form factor, with illustrated magnetic field lines of a magnetic field 236 radiating generally symmetrically and extending between the first magnetic pole 232 and the second magnetic pole 234. The magnet 230 is depicted in FIG. 2 as being encapsulated within the stylus body 202. In other implementations, the magnet 230 may be attached to the side of the stylus body 202, or otherwise coupled to the stylus body 202. In general, the magnet 230 can take on various sizes, shapes and geometries, and may be located in various positions within the stylus 102. For example, the magnet 230 may have an overall length of between about 10 and 200 millimeters and may be configured in shapes including a solid rod, bar, hollow rod, torus, disk, and so forth. The magnet 230 may be placed proximate to the stylus tip 120, the stylus end 122, or at a position between these endpoints.

The magnet 230 may be a rare earth permanent magnet, a magnetized ferromagnetic material, an electromagnet, or any other suitable magnet configuration. In one example, the magnet 230 may comprise two or more magnets coupled to a member capable of conveying magnetic flux, such as a ferrous metal. For example, a pair of small magnets may be coupled to opposite ends of an iron core to form the magnet 230. Such an implementation may provide benefits such as reduced weight, reduced cost, altered balance of the stylus for improved ergonomics, and so forth. Additionally, in some implementations, the stylus 102 may incorporate multiple magnets of the same or differing geometries configured to generate a magnetic field of desired, strength, size and shape. For example, a second magnet having a different orientation may provide a second detectable magnetic field having an orientation different from that of the magnet 230.

The stylus body 202 may comprise a non-ferrous material, for example conductive plastic or a non-ferrous metal that provides no or minimal interference to the magnetic field 236 emitted by the magnet 230. In other implementations, the stylus body 202 may comprise other conductive materials that provide known interactions with the magnetic field 236, such as ferrous materials. In some examples, the magnet 230 may be in a fixed position with respect to the stylus body 202, while in other examples, the magnet 230 may be allowed to move along a first axis of the stylus 102. In the implementations herein, the first axis of the stylus 102 extends from the tip 120 to the end 122.

Accordingly, the magnet 230 produces the magnetic field 236 that is detectable external to the stylus 102, such as by the one or more magnetic field sensors 114 included in the electronic device 100, as described above. Furthermore, while the magnet 230 is illustrated in this example as having a positive pole at the first pole 232 and a negative pole at the second pole 234, the magnet 230 is not limited to any particular orientation in the implementations herein. Additionally, in some implementations, the magnet 230 may also be configured to hold or assist in holding the stylus 102 to the electronic device 100 or to an accessory such as a cover. Other variations will also be apparent to those of skill in the art in light of the disclosure herein.

FIGS. 3A-3B illustrate an enlarged cross-sectional view of a portion of the stylus 102, depicting an example of varying the capacitive coupling based on an amount of force applied toward the tip 120 of the stylus 102 according to some implementations. As illustrated in FIG. 3A, the stylus tip 120 may be placed into contact with a contact surface 302 of the electronic device 100. For example, the contact surface 302 may be of any suitable material depending on the design and intended function of the device 100. In some cases, the contact surface 302 may be a protective layer, such as a plastic or glass layer, formed over a touch sensor layer 304 that includes the electrode grid of the touch sensor 104. In other cases, the touch sensor layer 304 may be embedded in or otherwise included in the contact layer 302. As another alternative, the touch sensor layer 304 may be located below a display layer that is includes the contact surface 302. Thus, in some cases, the contact surface 302 may include the display 108. In some examples, the touch sensor layer 304 may include a plurality of linear touch sensor electrodes arranged in respective rows and columns, which are typically formed as a grid of conductors (not shown in FIGS. 3A-3B). The touch sensor layer 304 may be in communication with a touch sensor controller 110 that receives electrical inputs from the electrodes in the touch sensor layer 304 for detecting a capacitive coupling with an external object such as the stylus 102, a user's finger, or the like. For example, the touch sensor controller 110 may periodically scan the touch sensor 304 (typically on the order of milliseconds). In some implementations, by performing periodic scans, the touch sensor controller 110 may periodically quantify any capacitance readings from the touch sensor layer 304 for sensing any inputs made by a user. The touch sensor controller 110 provides the scan data to the input module, which generates input data based on the capacitance readings for detecting touch inputs. For example, the input module 112 may identify and characterize touches, distinguish between types of touches, reject palmar touches or other extraneous touches, provide input data to an operating system or application currently presenting an image or user interface on the display 108, and so forth.

In the example of FIG. 3A, the distal tip portion 212 of the stylus tip 120 is placed in contact with the contact layer 302. For example, suppose that a user desires to make a touch input to the electronic device 100 using the stylus 102. The touch sensor 104 and touch sensor controller 110 may detect the presence of the distal tip portion 212 in contact with the contact surface 302 through detection of a change in capacitance along one or more of the rows and columns of electrodes in the touch sensor layer 304. In some examples, the touch sensor layer 304 may include a high-resolution touch sensor 104 as discussed above. In the example of FIG. 3A, suppose that the user is only applying light pressure, i.e., a first level of pressure, to the stylus tip 120 that does not substantially compress the spacer 218. Accordingly, a thickness of the spacer 218 at the first level of pressure may correspond to a distance D1 between the conductive plate 204 and the conductive area 216 of the proximal portion 214 of the tip 120. Thus, the touch sensor controller 110 is able to detect a first level of capacitive coupling based on the presence of the tip 120 in contact with the contact surface 302.

As illustrated in FIG. 3B, suppose that the user applies a force through the stylus body 202 in the direction of the tip 120 as indicated by arrow 306. For example, in order to simulate a conventional writing or drawing experience, the ability to detect a variation in the amount of pressure applied with the stylus 102 to the contact surface 302 can be used to generate a number of intuitive input effects. For instance, variations in input pressure may be used to generate corresponding variations in a darkness or a thickness of a line drawn using the stylus 102, or numerous other possible effects that may be generated based on detected variations in input pressure applied to the stylus tip 120. Consequently, when the user applies force to the stylus tip 120, i.e., a second level of pressure, the spacer 218 is compressed, thereby decreasing a distance between the conductive area 216 and the conductive plate 204 to a distance D2. This change in the distance between the tip 120 and the stylus body 202 causes a detectable change in the overall capacitive coupling between the user's hand and the touch sensor 104. Accordingly, based on the detected amount of change in capacitive coupling resulting from the change in the distance from D1 to D2, various different input effects may be provided.

In some examples, the input module 112 may provide a calibration routine whereby the user places the stylus 102 into contact with the contact surface 302 and first applies a minimal level of pressure, and then applies a large level of pressure. For example, the device 100 may be configured to calibrate the detected capacitive coupling for these two extremes and then detect proportional amounts of applied pressure between the two extremes. Such calibration may be useful to ensure that a user interface is responsive to the variations in pressure applied to the stylus tip 120 by the user.

Example Touch Sensor

Figure 4:
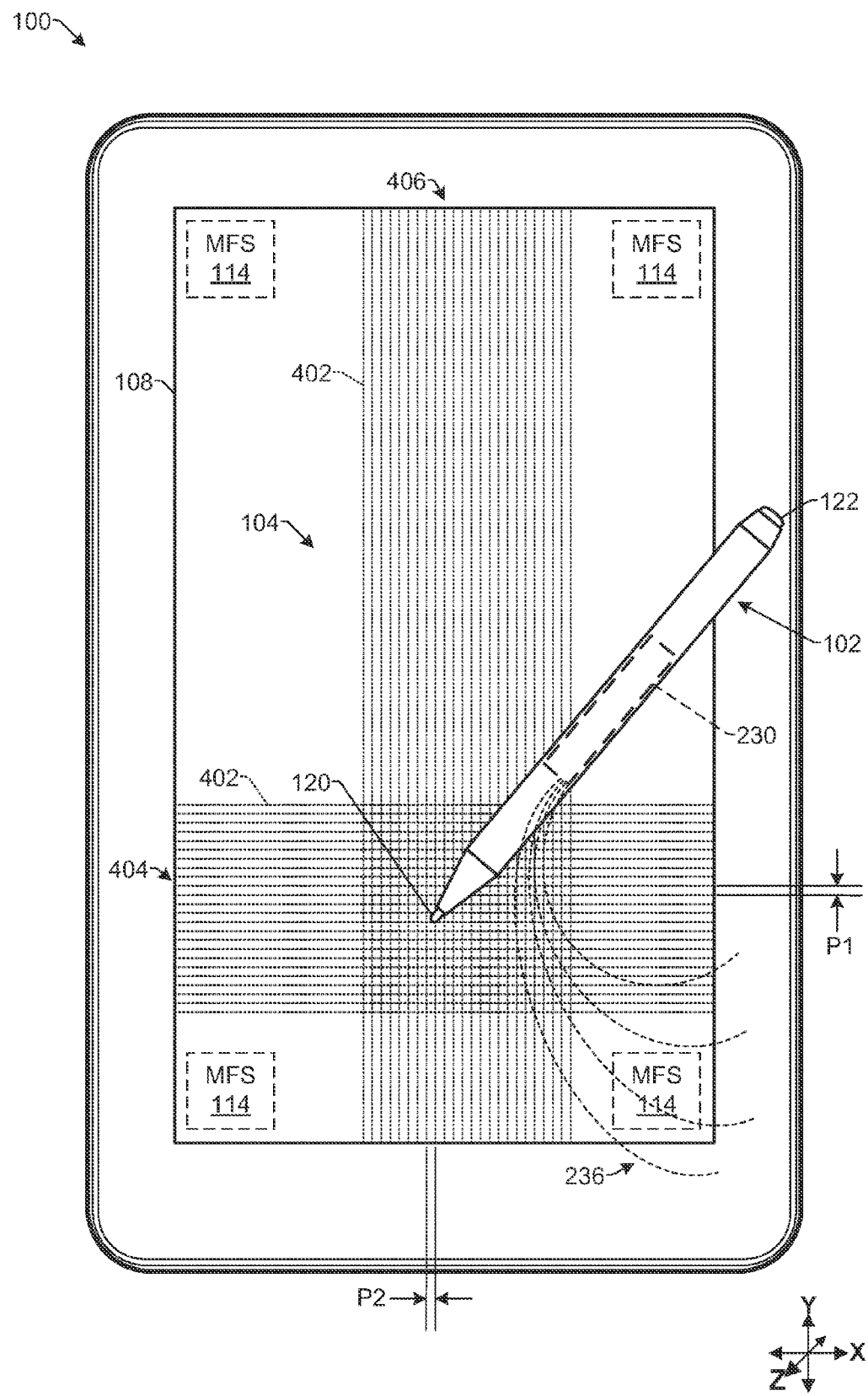
FIG. 4 illustrates an example electronic device including a high-resolution touch sensor and one or more magnetic field sensors for detecting the stylus according to some implementations.

FIG. 4 illustrates an example of the electronic device 100 including the touch sensor 104 according to some implementation. As mentioned above, a conventional capacitive touch sensor includes a plurality of rows and columns of linear electrodes 402. However, conventional capacitive touch sensors typically have a pitch between electrodes 402 that is too large to accurately detect an object the size of a stylus tip. For example, the pitch may be the distance from the centerline of a first electrode to the centerline of a nearest neighboring electrode in an array of linear parallel electrodes. Accordingly, some implementations herein may include a high-resolution touch sensor 104 that may have electrodes having a finer pitch. For example, the touch sensor 104 may include a plurality of rows 404 of electrodes extending in an x-axis direction across the display 108 and a plurality of columns 406 of electrodes extending in a y-axis direction across the display 108. Furthermore, while in the illustrated example of FIG. 4, the rows 404 and columns 406 of electrodes are shown as only occupying a portion of the display 108, it should be understood that this is for clarity of illustration only, and that typically the rows 404 and columns 406 of electrodes would occupy the full area of the display 108 or other touch sensor contact surface.

The rows of electrodes 404 may have a pitch P1 from one electrode row to the next row, and the columns of electrodes 406 may have a pitch P2 from one electrode column to the next column. In some examples, the pitch P1 may be equivalent to the pitch P2, while in other examples, the pitch P1 may be different from the pitch P2. As one non-limiting example, a 2 mm electrode pitch P1, P2 may be employed to track a stylus 102 with a tip diameter of about 1.5 mm. Accordingly, the pitches P1, P2 may be between 0.5 mm and 3.0 mm in some examples herein.

When the stylus 102 is touched to the touch sensor 104 (or a contact surface above or including the touch sensor 104), the tip 120 of the stylus 102 causes a change in the capacitance sensed along one or more of the electrode rows 404 and columns 406 in the vicinity of the tip 120. Additionally, if the user applies a force along the body of the stylus in the direction of the tip as discussed above with respect to FIG. 3B, the capacitive coupling between the stylus and the touch sensor may change by a detectable amount. Accordingly, changes in pressure applied by a user to the stylus tip may be detected and various input effects may be produced in response to detected changes in tip pressure. Furthermore, while the touch sensor 104 is described herein in connection with a display 108 of an electronic device 100, it should be understood that the touch sensor 104 and/or stylus 102 may be used independently of any display, such as with a stylus drawing pad or other touch-sensitive surface.

FIG. 4 also illustrates a plurality of magnetic field sensors (MFSs) 114 positioned within the device 100 for detecting the magnetic field 236 emitted by the magnet 230 of the stylus 102. For example, one or more magnetic field sensors 114 may be used to detect a proximity and an orientation of the stylus 102 with respect to the display 108 and/or touch sensor 104. The input module 112 may be configured to recognize, from data received from one or more magnetic field sensors 114, which end of the stylus 102 is in use and may modify input accordingly. For example, input determined to be from the stylus tip 120 may be configured to initiate a handwriting or drawing function on the device 100, while input determined to be from the stylus end 114 may be configured to be perform an eraser function, or to perform other functions, such as painting, highlighting text, and so forth. In other implementations, the orientation or angle of the stylus 102 relative to the display 108 and/or touch sensor 104 may be used to vary line width or for other features. As one example, when the stylus 102 is oriented close to perpendicular with respect to the x-y plane of display 108, a line drawn using the stylus 102 may be thin, and when the stylus 102 is oriented at an angle to the plane of the display, the line produced from the tip of the stylus may become progressively wider as the angle of the stylus moves progressively away from perpendicular.

The magnetic field sensors 114 within the device 100 are configured to detect magnetic fields, while the touch sensor 104 is configured to capacitively detect physical touches. The magnetic field sensors 114 may further be used to detect the presence of the stylus near to the device 100, prior to actual touching Thus, the information regarding the near proximity of the stylus may be used for palm rejection and rejection of other touches that are not intended to be inputs. In other words, when the stylus 102 is detected as being close to the display surface, it is likely that the stylus is being held in a user's hand, and any detected touch that looks like a palm or heel of a hand should be rejected.

In addition, when a portion of the stylus 102 is in contact with the touch sensor 104, the orientation of the magnetic field 236 along the first axis of the stylus 102 may be detected by the magnetic field sensors 114 and used to detect the orientation of the stylus relative to the display and/or touch sensor 104. The magnetic field sensor(s) 114 allow for the detection and characterization of an impinging magnetic field. For example, the magnetic field sensor(s) 114 may determine a field strength, angular bearing, polarity of the magnetic field, and so forth. Because magnetic fields, particularly in the environment within which electronic devices operate, are generally predictable and well understood, it becomes possible to determine proximity, position, orientation, and so forth of the stylus 102.

As shown in FIG. 4, the stylus 102 is positioned above the surface of the device 100. At least one magnetic field sensor 114 may be disposed beneath the display 108 or elsewhere in association with the device 100. The magnetic field sensor 114 senses the magnetic field 236 generated by the magnet 230 within the stylus 102, and is configured to provide data to characterize the magnetic field 236. Several angular comparisons may be made within the magnetic field sensor 114. By analyzing the angular variation and utilizing known characteristics about the magnet 230, the input module 112 of the device 100 is able to determine an angular bearing of the magnet 230 and thereby the stylus 102. In some examples, individual magnetic field sensors 114 sense the magnetic field 236 along only one direction, and so multiple magnetic field sensors, generally oriented orthogonally with respect to each other (or oriented such that they respectively measure generally orthogonal magnetic field components) may be used.

Furthermore, the magnetic field sensor 114 may also determine a field strength measurement. When compared to a known source such as the magnet 230 within the stylus 102, the input module 112 may estimate distance to a magnetic field source based at least in part upon the field strength. The input module 112 may also use data from the magnetic field sensor 114 to determine a field orientation. The orientation of a magnetic field may be considered the determination of which end of the magnet is the north pole and which is the south pole. This field orientation may be used to determine which end of the stylus 102 is proximate to the contact surface of the device 100. Further in some cases the magnetic field sensors may determine a position of the stylus in the z-axis direction, as well as the x- and y-axis directions.

In some examples, the input module 112 may provide a calibration routine whereby the user places the stylus 102 in one or more known positions and/or orientations, and magnetic field sensor 114 output is assessed. For example, the device 100 may be configured to calibrate field strength, position, and orientation information when the stylus 102 is docked with the device 100. This calibration may be useful to mitigate interference from other magnetic fields such as those generated by audio speakers, terrestrial magnetic field, adjacent electromagnetic sources, and so forth.

FIGS. 5A-5C illustrate an example in which the touch sensor 104 may be used to detect an amount of input force or pressure applied by a user's finger or an orientation of the user's finger according to some implementations. In this example, as illustrated in FIG. 5A, a user's finger 502 may touch the contact surface 302 at a finger touch location 504 with a light level of pressure or at a first orientation, as indicated by arrow 506. Alternatively, as illustrated in FIG. 5B, the user's finger 502 may touch the contact surface 302 at finger touch area location 504 with a substantially higher level of pressure, as indicated by arrow 508, and/or at a different orientation, i.e., at a different angle to the contact surface 302. As illustrated in FIG. 5C, the relative detectable footprints or finger touch areas of the two touches are substantially different in area and/or shape, and can thereby be distinguished by the touch sensor 104. For example, the light level of pressure 506 may result in a first touch footprint 510 having a first size or shape, while the heavier level of pressure 508 at a different orientation may result in a touch footprint 512 having an area almost twice as large as the first touch area and/or with a different shape.

With use of the high-resolution touch sensor 104, a first number of electrodes 514 are able to detect the first touch footprint 510 and a larger, second number of electrodes 516 are able to detect the second touch footprint 512. Accordingly, the high-resolution touch sensor 104 may distinguish between the two touch footprints 510, 512 based on differences in capacitances detected by the different numbers of electrodes 514, 516 affected by each respective touch input. Consequently, for a particular user, the input module 112 is able to distinguish between the amount of force applied to each touch input and/or the orientation of the finger during each touch input for the particular user. For example, the amount of force applied and/or the orientation of the finger may be directly related to the size and shape of the touch footprints 510, 512 which may be determined based on the number of electrodes 402 affected by each touch input. The detected differences in applied pressure and orientation for particular touch inputs may be used to achieve various input effects. For example, a user may essentially change the force of a touch input to select a control, press a button, and so forth. Further, changes in orientation may be used for drawing effects and other input effects. Numerous other possible uses will be apparent to those of skill in the art having the benefit of the disclosure herein.

FIGS. 5D-5F illustrate an example in which the touch sensor 104 may be used to detect an amount of input force applied by a stylus or an orientation of the stylus according to some implementations. In this example, as illustrated in FIG. 5D, a stylus 520 may have a deformable tip 522. In the illustrated example, the tip 522 is a brush or brush-like tip made up of a plurality of conductive bristles, but other types of deformable tips may also be used in some examples herein. The tip 522 may touch the contact surface 302 at a touch location 524 with a light level of pressure or at a first orientation. Alternatively, as illustrated in FIG. 5E, the tip 522 may touch the contact surface 302 at touch area location 526 with a substantially higher level of pressure and/or at a different orientation, i.e., at a different angle to the contact surface 302. As illustrated in FIG. 5F, the relative detectable footprints or touch areas of the two touch inputs are substantially different in area and shape, and can thereby be distinguished by the touch sensor 104. For example, the light level of pressure in FIG. 5D may result in a first touch footprint 528 having a first size or shape, while the heavier level of pressure or different orientation may result in a second touch footprint 530 having a larger area and substantially different shape.

With use of the high-resolution touch sensor 104, a first number of electrodes 532 are able to detect the first touch footprint 528 and a larger, second number of electrodes 534 are able to detect the second touch footprint 530. Accordingly, the high-resolution touch sensor 104 may distinguish between the two touch footprints 528, 530 based on differences in capacitances detected by the different numbers of electrodes 532, 534 affected by each respective touch input. Consequently, the input module 112 is able to distinguish between the amount of force applied and/or the orientation of each touch input for the stylus 520. For example, the amount of force applied and/or the orientation of the stylus 520 may be related to the size and shape of the touch footprints 528, 530, which may be determined based on the number of electrodes 402 affected by each touch input. The detected differences in applied pressure and orientation for particular touch inputs may be used to achieve various input effects, as mentioned above.

FIGS. 5G-5I illustrate another example in which the touch sensor 104 may be used to detect an amount of input force applied by a stylus or an orientation of the stylus according to some implementations. In this example, as illustrated in FIG. 5G, a stylus 540 may have a chiseled tip 542 having one or more angled contact areas. In the illustrated example, the tip 542 is a brush-like chiseled tip, but other types of shaped tips, having various chisel configurations, points, angled surfaces, or the like, may also be used in some examples herein. The tip 542 may touch the contact surface 302 at a touch location 544 with a light level of pressure and/or at a first orientation (i.e., substantially vertical in this example). Alternatively, as illustrated in FIG. 5H, the tip 542 may touch the contact surface 302 at touch area location 546 with a substantially higher level of pressure and/or at a different orientation, i.e., at a different angle 548 to the contact surface 302. As illustrated in FIG. 5I, the relative detectable footprints or touch areas of the two touch inputs are substantially different in area and shape, and can thereby be distinguished by the touch sensor 104. For example, the light level of pressure in FIG. 5G at the first orientation may result in a first touch footprint 550 having a first size or shape, while the heavier level of pressure or the different orientation 548 may result in a second touch footprint 552 having a larger area and substantially different shape.

With use of the high-resolution touch sensor 104, a first number of electrodes 554 are able to detect the first touch footprint 550 and a larger, second number of electrodes 556 are able to detect the second touch footprint 552. Accordingly, the high-resolution touch sensor 104 may distinguish between the two touch footprints 550, 552 based on differences in capacitances detected by the different numbers of electrodes 554, 556 affected by each respective touch input. Consequently, the input module 112 is able to distinguish between the amount of force applied and/or the orientation of each touch input for the stylus 540. For example, the amount of force applied and/or the orientation of the stylus 540 may be related to the size and shape of the touch footprints 550, 552, which may be determined based on the number of electrodes 402 affected by each touch input. The detected differences in applied pressure and orientation for particular touch inputs may be used to achieve various input effects, as mentioned above.

Example Styli

Figure 6:
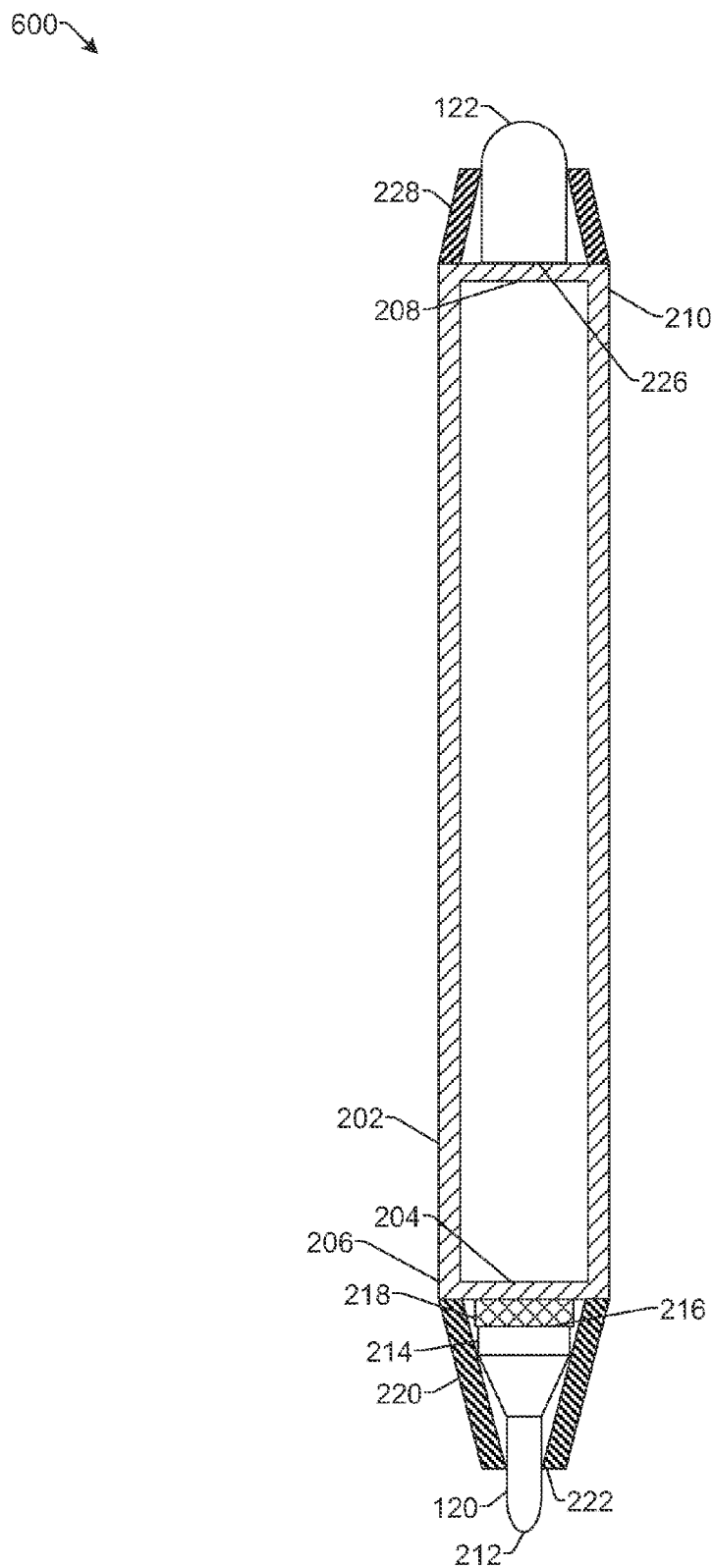
FIG. 6 illustrates a cross-sectional view of an example stylus according to some implementations.

FIG. 6 illustrates an example configuration of a stylus 600 according to some implementations. In the example of FIG. 6, the stylus 600 does not rely on a magnet for determining orientation, but instead relies on the touch sensor 104 to detect a difference in capacitive coupling between the tip 120 of the stylus and the end 122 of the stylus. For example, when the stylus 600 is used with the high-resolution touch sensor 104, the touch sensor 104 may distinguish between a capacitive signal produced when the stylus tip 120 touches the contact surface and the capacitive signal produced when the stylus end 122 touches the contact surface. For example, the tip 120 may be constructed to have a substantially different capacitance from the capacitance of the stylus end 122. Thus, the touch sensor 104 may distinguish between the tip 120 and the stylus end 122 based on a detected difference in capacitive coupling when one or the other of the tip 120 or the end 122, respectively, are applied to the contact surface of the device 100. Accordingly, the magnet 230 and the magnetic field sensors 114 may be eliminated in this configuration.

Further, in some examples, the stylus 600 may retain the force sensitive input characteristics of the stylus 102, as discussed above with respect to FIGS. 2-4. However, in other examples, one or both of the spacers 218, 224 may be eliminated. Therefore, while some examples of the stylus 600 may be non-pressure responsive, the stylus 600 may still employ a first function, such as writing, with the tip 120 and a second function, such as erasing or highlighting, with the stylus end 122. As one example, the tip 120 may be constructed with the spacer 218, as shown in FIG. 6, and as described above with respect to FIGS. 2-4, while the stylus end 122 may be connected directly to the stylus body at portion 208, and may thereby have a capacitance that is substantially different from that of the tip 120. Numerous other variations will be apparent to those of skill in the art having the benefit of the disclosure herein.

Figure 7:
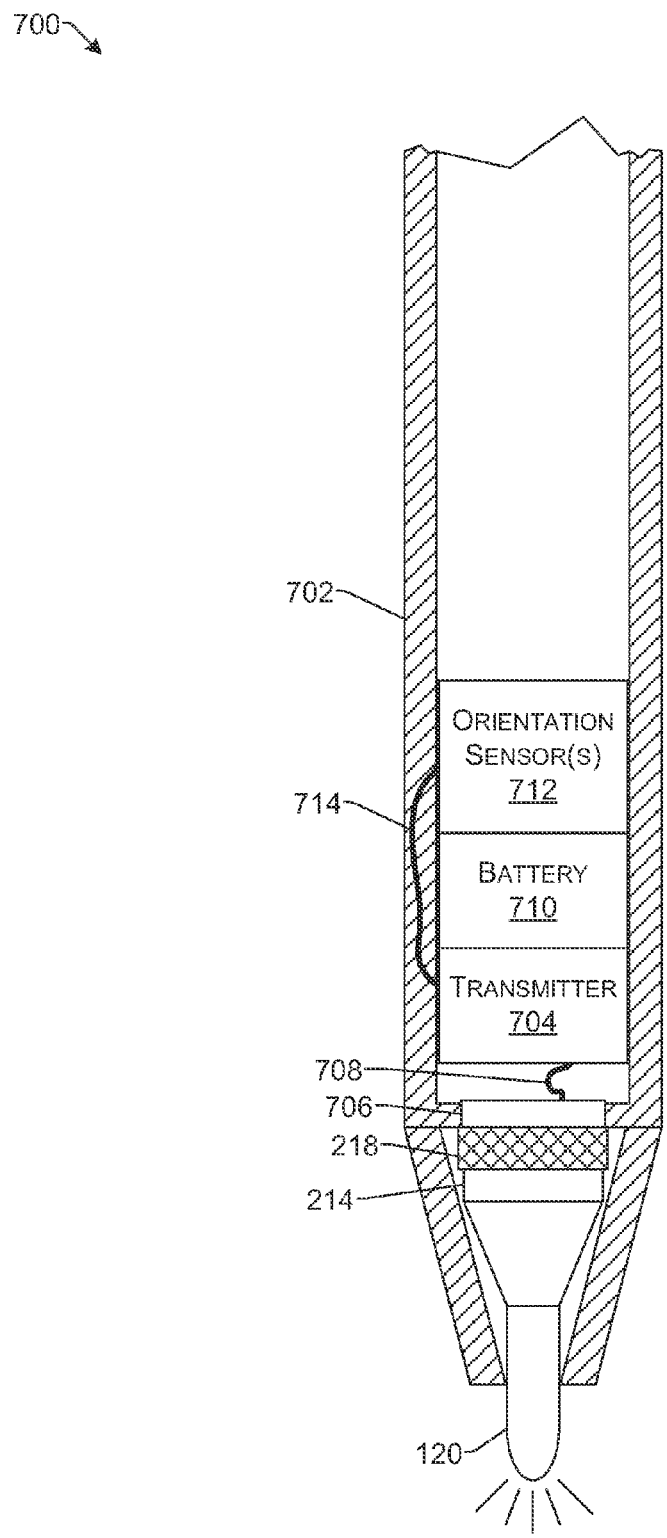
FIG. 7 illustrates a cross sectional view of a portion of an example active stylus according to some implementations.

FIG. 7 illustrates an example configuration of an active stylus 700 according to some implementations. In the example of FIG. 7, the stylus 700 includes a stylus body 702, which may be of any suitable nonconductive material. For example, because the stylus 700 produces an active signal that is detectable by the capacitive touch sensor 104 to indicate a position of the tip, it is not necessary for the stylus 700 to enable capacitive coupling between the user's hand and the touch sensor 104. Instead, the stylus 700 may include a transmitter 704 that is electrically connected to a first conductive capacitive plate 706 by an electrical connection 708. Further, a battery 710 may supply power to the transmitter 704. The transmitter 704 may transmit a signal through the electrical connection 708 to the plate 706. The signal from the transmitter 704 may be modulated based on a capacitance between the plate 706 and the tip base 214. For example, the capacitance varies based on the amount of compression of the compressible spacer 218. The frequency of the signal from the transmitter 704 may be modulated by the varying capacitance and then emitted by the tip 120. Accordingly, based on the amount of pressure applied to the tip 120 to compress the spacer 218, the capacitance between the plate 706 and the tip base 214 with vary, which in turn modulates the frequency of the transmitted signal. This modulation in the transmitted signal can be detected by the touch sensor 104 and/or the input module 112 of the electronic device 100 for determining an amount of pressure applied to the tip 120 of the stylus 102. A similar arrangement may be provided at an eraser end of the stylus 700.

Additionally, in some examples, the active stylus 700 may include one or more orientation sensors 712. Information from the one or more orientation sensors 712 may be provided to the transmitter 704 through a connection 714. The orientation information may be further included in the signal transmitted by the transmitter 704 to provide an indication of an angle at which the stylus 700 is disposed relative to the device 100 and/or an indication of whether the stylus tip or the stylus end is proximate to the touch sensor 104. Alternatively, in some examples, the orientation sensor(s) 712 may not be used and, instead, the stylus 700 may include a magnet, such as magnet 230, which may be sensed by one or more magnetic field sensors 114 associated with the device 100, as discussed above with respect to FIGS. 1, 2 and 4. Thus, the magnet 230 may enable the electronic device 100 to determine an orientation of the stylus 700, such as an angle at which the stylus is disposed with respect to the display and/or which end of the stylus 700 is proximate to the contact surface.

Example Framework

Figure 8:
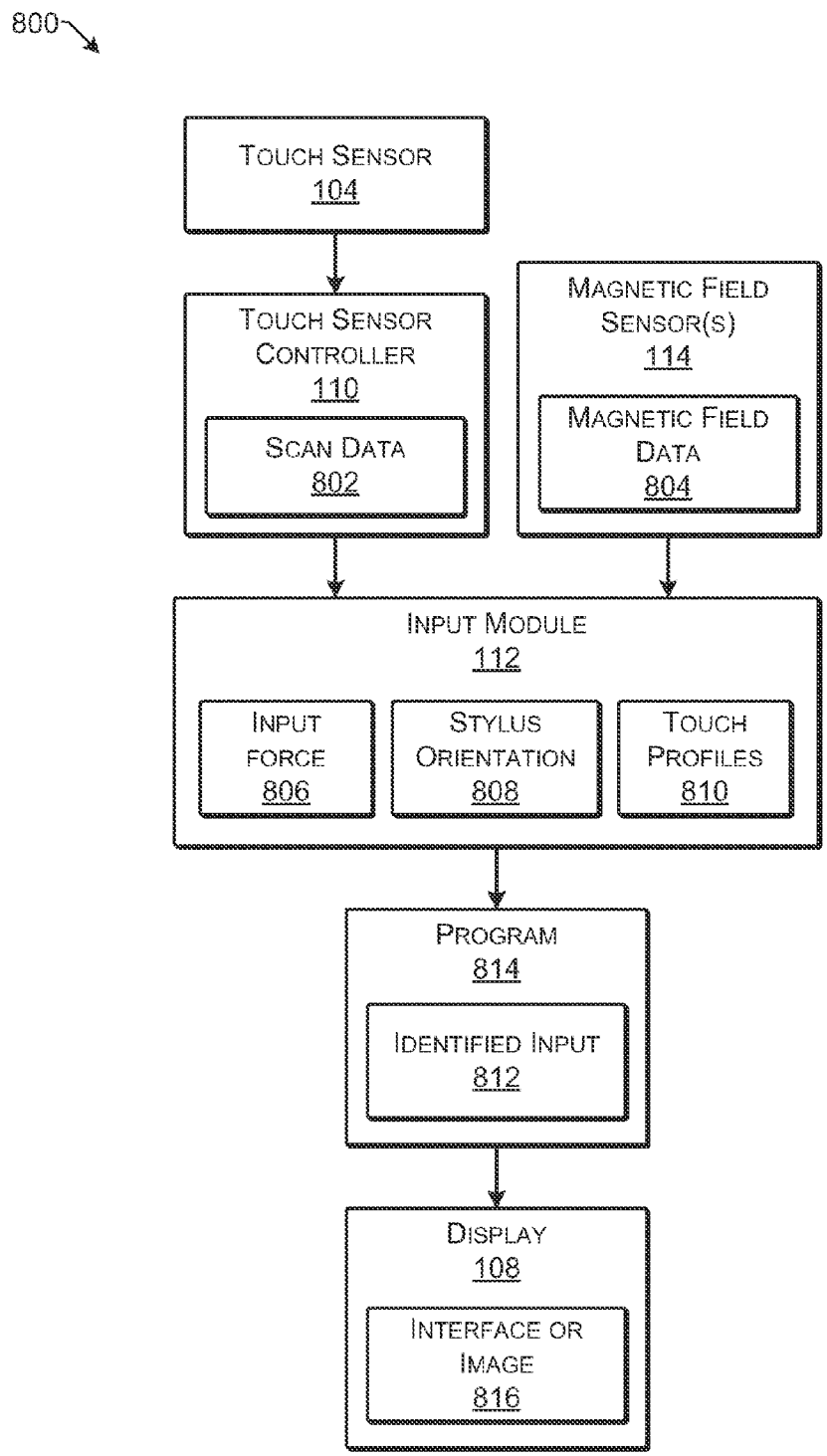
FIG. 8 illustrates an example framework for identifying touch inputs from a stylus using a capacitive touch sensor and a magnetic field sensor according to some implementations.

FIG. 8 illustrates an example framework 800 for detecting touch inputs made to the touch sensor 104 using the stylus 102 according to some implementations. In the example of FIG. 8, the touch sensor controller 110 may periodically scan the touch sensor 104 and provide scan data 802 from the scans to the input module 112. Furthermore, the magnetic field sensor(s) 114 may provide magnetic field data 804 to the input module 112. A sampling time of the scan data 802 and the magnetic field data 804 may be matched by the input module 112 to correlate the scan data 802 and the magnetic field data 804.

The input module 112 may determine from the scan data 802 and the magnetic field data 804 various characteristics with respect to a touch type and an input object. Types of data that may be determined from the scan data 802 and/or the magnetic field data 804 include a location of a detected object with respect to the input sensor grid, a size of the detected object, a shape of the detected object and movement (e.g., speed and direction) of the detected object. For instance, various different input objects may generate different capacitive signal profiles. If a user touches the contact surface with a palm, rather than a finger or a stylus, the capacitive effect will be larger than for a finger or stylus, but spread out over a broader area of the touch sensor 104. Accordingly, the signal profile of, for example, a portion of a palm may be identified and distinguished from that of a single finger or a stylus that touches the display. Furthermore, when a stylus touch is detected, a change in capacitive coupling may indicate a change in input force 806. For example, when the input is from the stylus 102, as described herein, having a capacitive coupling that varies according to an applied pressure on the tip, the input module 112 may detect the change in capacitive coupling from one scan to the next. Furthermore, the magnetic field data may indicate a stylus orientation 808. The input module 112 may further compare the scan data 802 to one or more touch profiles 810. For example, the scan data 802 may correspond to a particular profile for identifying a touch as an input of a particular type at an identified location, or for discarding a touch as a palm touch or other unintended touch. Scan data 802 from multiple successive scans may be used for recognizing motions, movements, actions, or other types of user inputs.

When the input module 112 has identified an input 812, including a force of an input and an orientation of a stylus, if applicable, the input module 112 may send a communication regarding the indentified input 812 to a program 814, such as an operating system (OS) or an application that is currently displaying a user interface or image with which the user is interacting. For example, if the OS of the device is currently displaying a user interface, the detected input is routed to the OS. The OS receives the input 812 and may perform an operation in response to the input 812, such as modifying an interface or image 816 displayed on the display 108. As another example, when the user is interacting with the user interface of an application, the input is provided to the application and the application may perform a function corresponding to the detected input, such as updating interface or image 816 on the display 108.

Example Electronic Device

Figure 9:
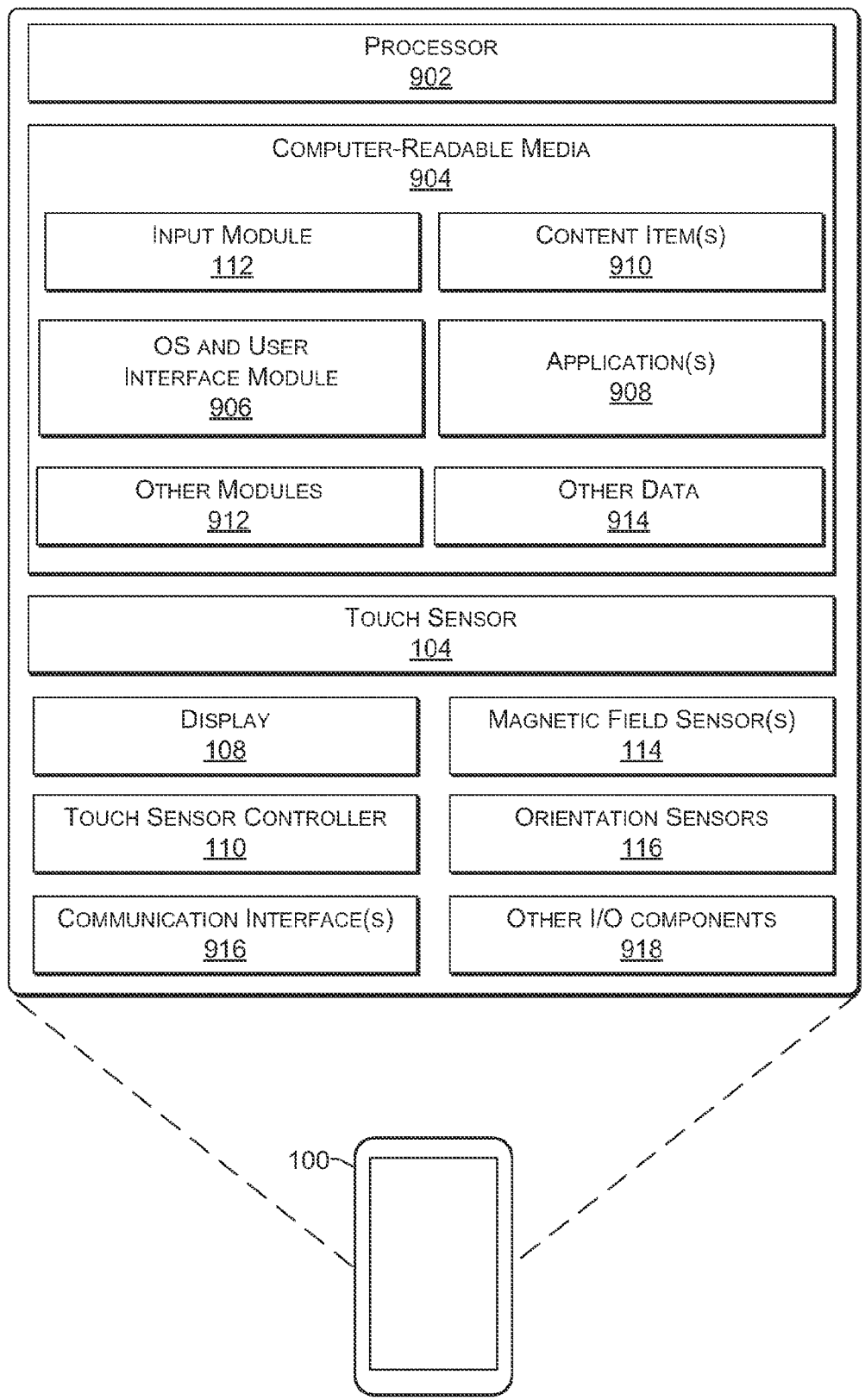
FIG. 9 illustrates select components of an example electronic device according to some implementations.

FIG. 9 illustrates select example components of the electronic device 100 that may be used to implement the functionality described above according to some implementations. In a very basic configuration, the electronic device 100 includes or accesses components, such as at least one processor 902 and a computer-readable media 904. Each processor 902 may itself comprise one or more processors or cores. Depending on the configuration of the electronic device 100, the computer-readable media 904 may be an example of non-transitory computer storage media and may include volatile and nonvolatile memory and/or removable and non-removable media implemented in any type of technology for storage of information such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium which can be used to store information and which can be accessed by the processor 902 directly or through another computing device. Accordingly, the computer-readable media 904 may be computer-readable media able to maintain instructions, modules or components executable by the processor 902.

The computer-readable media 904 may be used to store any number of functional components that are executable by the processor 902. In some implementations, these functional components comprise instructions or programs that are executable by the processor 902 and that, when executed, implement operational logic for performing the actions attributed above to the input module 112 and the device 100. Functional components of the electronic device 100 stored in the computer-readable media 904 may include the input module 112, as described above, which may be executed on the processor 902 for implementing the detection of touch inputs, such as from stylus 102 or a finger. Additional functional components stored in the computer-readable media 904 may include an operating system and user interface module 906 for controlling and managing various functions of the device 100. Depending on the type of the device 100, the computer-readable media 904 may also optionally include one or more applications 908, one or more content items 910, other modules 912, such as drivers, communication modules, security modules, and the like, and other data 914, which may include, for example, the scan data 802, the magnetic field data 804, and data of other logical, programmatic and physical components, of which those described above are merely examples that are related to the discussion herein.

FIG. 9 further illustrates that the example device 100 includes the touch sensor 104 described above, which may be a high-resolution touch sensor to enable a user of the device 100 to operate and interact with the device 100 via touch inputs with the stylus 102. In one implementation, the touch sensor 104 may be placed behind the display 108, such that user input through contact relative to the display 108 may be sensed by the touch sensor 104. In another implementation, the touch sensor 104 may be placed in front of the display 108, or in another part of the device altogether. In some instances, the touch sensor 104 and the display 108 are integral to provide a touch-sensitive display that displays a user interface, applications, or content items and allows users to navigate via touch inputs.

The touch sensor controller 110 may be included in the electronic device 100 for controlling the touch sensor 104. For example, the touch sensor controller 110 may be an integrated circuit or chip including functionality for periodically scanning the touch sensor electrodes and providing the scan data to the input module 112. In other examples, the touch sensor controller 110 is not used and the input module 112 controls and scans the touch sensor 104.

FIG. 9 further illustrates the display 108, which may be passive, emissive or any other form of display. In one implementation, the display 108 uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 108 may be an active display such as a liquid crystal display, plasma display, light emitting diode display, organic light emitting diode display, and so forth. These displays may comprise drive electronics, such as a display drive matrix configured to affect individual pixels within the display 108. In some examples, the display 108 may be a 3D display capable of providing a 3D image. For example, the display 108 may produce a 3D image by providing alternating left-eye and right-eye images with or without the use of shuttering or filtering eyeglasses.

In some implementations, multiple displays 102 may be present on the electronic device 100. These multiple displays may be located in the same or different enclosures or panels. When multiple displays are present, these displays may be of the same or different types. For example, one display may be an electrophoretic display while another may be a light emitting diode display. For convenience only, the display 108 is shown in a generally rectangular configuration. However, it is understood that the display 108 may be implemented in any shape, and may have any ratio of height to width. Also, for stylistic or design purposes, the display 108 may be curved or otherwise non-linearly shaped. Furthermore, the display 108 may be flexible and configured to fold or roll.

One or more communication interfaces 914 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 914 may allow a user of the electronic device 100 to access the World Wide Web, download content items 910 from a content item service, such as a from a website or other online service, and the like. The communication interface 914 may further allow a user to access storage on another device, such as a user's computing device, a network attached storage device, or the like.

The electronic device 100 may further include the orientation sensors 116. As mentioned above, the orientation sensors 116 may include devices such as such as accelerometers, gravimeters, gyroscopes, or the like. The orientation sensors 116 may be used for determining an orientation of the device 100, as well as for providing a reference for determining an orientation of the stylus 102.

The electronic device 100 may further be equipped with various other input/output (I/O) components 918. Such I/O components may include various controls (e.g., buttons, a joystick, a keyboard, etc.), speakers, a microphone, a camera, connection ports, and so forth, which may be activated by the user. For example, the operating system 906 of the electronic device 100 may include suitable drivers configured to accept input from a keypad, keyboard, or other controls and devices included as the I/O components 918. For instance, the controls may include page turning buttons, navigational keys, a power on/off button, selection keys, and so on. Additionally, the electronic device may include various other components that are not shown, examples of which include removable storage, a power source, such as a battery and power control unit, a global positioning system (GPS) device, a PC Card component, and so forth.

Various instructions, methods and techniques described herein may be considered in the general context of computer-executable instructions, such as program modules stored on computer storage media, such as computer-readable media 904, and executed by the processor 902. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Processes

Figure 10:
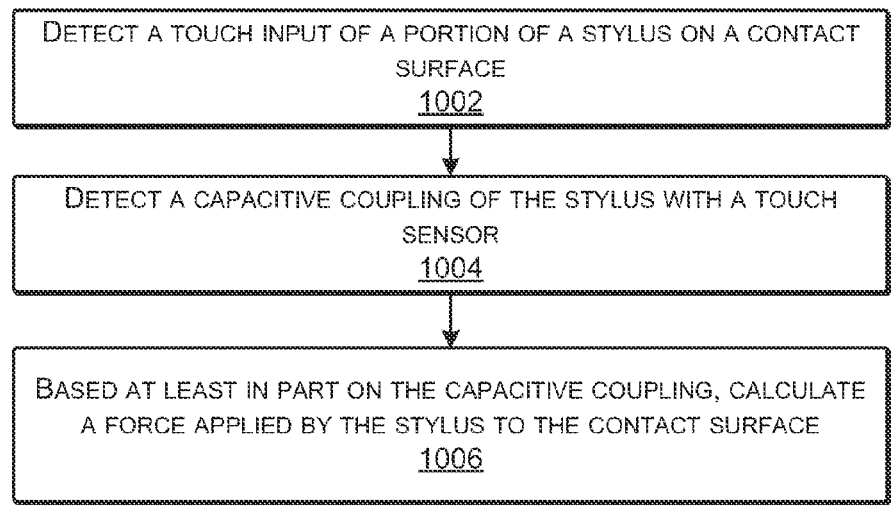
FIG. 10 is a flow diagram illustrating an example process for detecting a force applied by a stylus according to some implementations.
Figure 11:
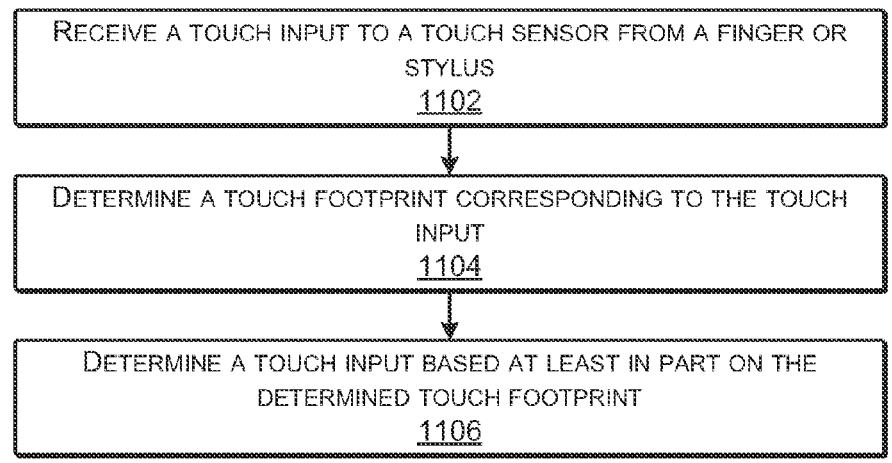
FIG. 11 is a flow diagram illustrating an example process for detecting a force and/or orientation during a touch input according to some implementations.

FIGS. 10-11 illustrate example processes for implementing the techniques described above. These processes are illustrated as a collection of operations in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

FIG. 10 is a flow diagram illustrating an example process 1000 that may be executed by the device 100 for detecting force applied by a stylus according to some implementations herein.

At 1002, the device may detect a touch input of a portion of a stylus on a contact surface. For example, a user may touch a stylus to a contact surface of the electronic device such as to a display, a touch sensor surface, or other surface.

At 1004, the device detects a capacitive coupling of the stylus with the touch sensor. For example, the user may push down or otherwise apply pressure to the tip of the stylus, which may result in a particular amount of capacitive coupling of the stylus with the touch sensor. In some cases, the stylus may have been calibrated with the touch sensor, such that the electronic device is able to determine, from the amount of capacitive coupling, a particular amount of force applied by the stylus to the contact surface. Further, the touch sensor may detect a change in capacitive coupling when a greater or lesser amount of force is applied to the stylus tip, which may enable the electronic device to determine a change in force applied based on the change in capacitive coupling.

At 1006, based at least in part on the capacitive coupling, the device may calculate a force applied by the stylus to the contact surface. As one example, the stylus and touch sensor may have been calibrated for various different levels of capacitive coupling corresponding to various different levels of force. As another example, as the force applied to the tip of the stylus increases, the capacitive coupling may change in a proportional manner, thereby enabling calculation of a change in force that is proportional to the change in the capacitive coupling.

FIG. 11 is a flow diagram illustrating an example process 1100 that may be executed by the device 100 for detecting a touch input according to some implementations.

At 1102, the device receives a touch input to a touch sensor from a finger or stylus. For example, the device may receive a touch input to a capacitive touch sensor from a finger of a user. In other instances, the device may receive a touch input from a stylus having a deformable tip. The deformable tip may be brush-like tip or any other type of deformable tip. In some cases, the tip may be chiseled, having one or more angled contact areas. In some examples, the touch sensor may be a high-resolution touch sensor having a plurality of electrodes with the pitch of 3.0 mm or less.

At 1104, the device determines a touch footprint corresponding to the touch input. For example, based on the number of electrodes affected by the touch input, in both the x-axis and y-axis directions, an area of the touch input and a shape of the touch input corresponding to a touch footprint can be calculated by the device. For example, in some cases, the stylus may have a deformable tip having a different shape depending on the amount of force applied to the deformable tip or an orientation of the stylus with respect to the contact surface of the touch sensor. As one example, the stylus tip may be a brush or brush-like tip that provides a substantially different touch input shape at different levels of force or at different orientations.

At 1106, the device determines a touch input based at least in part on the determined touch footprint. For example, a small touch footprint of a first shape may indicate a light touch pressure or a vertical orientation, while a larger touch area of a second shape may indicate a larger touch pressure or an oblique angle of the stylus or finger. The input detection may be calibrated for a particular user having fingers of a particular size or a stylus of a particular tip configuration, so that the pressure and orientation calculation may be determined reliably based on calibrated input footprints predetermined for various different pressures and/or orientations.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A stylus comprising:
   a body having a first end and a second end, the body being electrically conductive, at least in part, to form an electrical contact with a hand of a user;
   a conductive stylus tip disposed at the first end of the body;
   a first compressible nonconductive spacer positioned between the conductive stylus tip and the first end of the body, the first compressible nonconductive spacer being compressible to change a distance between the conductive stylus tip and the body for changing a capacitive coupling of the stylus to a touch sensor in response to a force applied to the body in a direction of the conductive stylus tip;
   a magnet disposed within or attached to the body, the magnet emitting a magnetic field; and
   a conductive stylus end disposed at the second end of the body, wherein a first capacitive coupling resulting from direct contact of the conductive stylus tip with a surface associated with a capacitive touch sensor is detected by the capacitive touch sensor to be different from a second capacitive coupling resulting from direct contact of the conductive stylus end with the surface.

2. The stylus of claim 1, wherein the compressible nonconductive spacer is a first spacer, the stylus further comprising:
   a second compressible nonconductive spacer positioned between the conductive stylus end and the second end of the body, the second spacer being compressible to change a distance between the stylus end and the second end of the body for changing a capacitive coupling of the stylus to the touch sensor in response to a force applied to the body in a direction of the stylus end.

3. The stylus of claim 1, wherein the first compressible nonconductive spacer is formed of a resilient closed cell polymer.

4. The stylus of claim 1, further comprising a tip housing constructed of a nonconductive material for retaining the conductive stylus tip, at least in part, at the first end of the body.

5. The stylus of claim 1, wherein the conductive stylus tip is formed at least in part from a conductive polymer.

6. A stylus comprising:
   a body having a first end and a second end, the body being electrically conductive, at least in part, to form an electrical contact with a hand of a user;
   a conductive stylus tip disposed at the first end of the body;
   a conductive stylus end disposed at the second end of the body, wherein a first capacitive coupling resulting from direct contact of the conductive stylus tip with a surface associated with a capacitive touch sensor is detected by the capacitive touch sensor to be different from a second capacitive coupling resulting from direct contact of the stylus end with the surface; and a dielectric spacer positioned between the conductive stylus tip and the first end of the body, the dielectric spacer being compressible to change a distance between the conductive stylus tip and the first end of the body for changing a capacitive coupling of the stylus to the touch sensor in response to a force applied to the body in a direction of the conductive stylus tip.

7. The stylus of claim 6, wherein the compressible dielectric spacer is formed of a resilient closed cell polymer.

8. The stylus of claim 6, further comprising a dielectric spacer positioned between the conductive stylus end and the second end of the body, the dielectric spacer being compressible to change a distance between the stylus end and the second end of the body for changing a capacitive coupling of the stylus to the touch sensor in response to a force applied to the body in a direction of the stylus end.

9. The stylus of claim 6, further comprising a magnet disposed within or attached to the body, the magnet emitting a magnetic field to be detected for indicating at least one of:
   a proximity of the stylus to an electronic device; or
   an orientation of the stylus to the electronic device.

10. A stylus comprising:
   a stylus body having a first end and a second end;
   a stylus tip disposed at the first end of the body, the stylus tip including a conductive portion;
   a nonconductive spacer positioned between the conductive portion of the stylus tip and a conductive plate at the first end of the body, the nonconductive spacer being compressible to change a distance between the conductive portion of the stylus tip and the conductive plate for changing a capacitance in response to a force applied to the body in a direction of the stylus tip; and
   a transmitter for transmitting a signal through the stylus tip to be received by a capacitive touch sensor, the signal being modulated by variations in the capacitance, wherein the signal is used for indicating a position of the stylus tip relative to the capacitive touch sensor.

11. The stylus of claim 10, further comprising one or more orientation sensors disposed on the stylus, the transmitter transmitting information from the one or more orientation sensors to provide orientation information in the transmitted signal.

12. The stylus of claim 10, wherein the nonconductive spacer is a resilient compressible porous dielectric material.

13. One or more non-transitory computer-readable media maintaining instructions that, when executed by one or more processors, program the one or more processors to perform operations comprising:
   detecting a touch of a portion of a stylus on a contact surface;
   detecting a capacitive coupling of the stylus body to an end of the stylus; and
   based at least in part on the capacitive coupling, calculating a force applied by the stylus body to the end of the stylus;
   determining a user input corresponding, at least in part, to the force; and
   sending information related to the user input to a program displaying an image on a display.

14. The one or more non-transitory computer-readable media of claim 13, the operations further comprising:
   detecting a change in a capacitive coupling of the stylus body to the end of the stylus; and
   calculating a change in the force applied by the stylus body to the end of the stylus at least in part in proportion to the detected change in the capacitive coupling.

15. The one or more non-transitory computer-readable media of claim 14, wherein the operation of detecting the touch of the portion of the stylus on the contact surface further comprises detecting a touch input of a conductive stylus tip that is mounted on the end of the stylus.

16. The one or more non-transitory computer-readable media of claim 15, the operations further comprising generating variations in a darkness or a thickness of a line drawn using the stylus based in part on the calculated change in the force applied by the stylus body to the end of the stylus.

17. The one or more non-transitory computer-readable media of claim 14, wherein detecting the touch of the portion of the stylus on the contact surface further comprises detecting a touch input of a conductive stylus end mounted on an end of the stylus opposite to a conductive stylus tip.

18. A stylus comprising:
   a body having a first end and a second end;
   a stylus tip disposed at the first end of the body;
   a compressible nonconductive spacer positioned between the stylus tip and the first end of the body, the compressible nonconductive spacer being compressible to change a distance between the stylus tip and the body for changing a capacitive coupling of the stylus to a touch sensor in response to a force applied to the body in a direction of the stylus tip;
   one or more orientation sensors; and
   a transmitter configured to receive orientation information from the one or more orientation sensors and transmit the orientation information.

19. The stylus of claim 18, wherein the body is electrically conductive, at least in part, to form an electrical contact with a hand of a user.

20. The stylus of claim 18, wherein the stylus tip is electrically conductive, at least in part.

21. The stylus of claim 18, further comprising a magnet disposed within or attached to the body.

22. A method comprising:
   determining, by one or more processors, a touch of a first physical contact between a portion of a stylus and a contact surface based at least in part on detecting a touch input of a conductive stylus tip that is disposed at a first stylus end of the stylus;
   detecting, using touch sensor associated with the contact surface, a change in a capacitive coupling of the stylus;
   based at least in part on the change in capacitive coupling, calculating a force applied by a body of the stylus to the conductive stylus tip;
   determining a user input based at least in part on the calculated force; and
   ignoring a second physical contact with the contact surface based at least in part on magnetic field information associated with a magnet associated with the stylus.

* * * * *